United States Patent
Fiechter et al.

(10) Patent No.: US 7,219,123 B1
(45) Date of Patent: May 15, 2007

(54) PORTABLE BROWSER DEVICE WITH ADAPTIVE PERSONALIZATION CAPABILITY

(75) Inventors: Claude-Nicolas Fiechter, Sunnyvale, CA (US); Amir Ben-Efraim, Redwood City, CA (US); T Hea Nahm, Los Altos, CA (US); David Hudson, San Francisco, CA (US)

(73) Assignee: At Road, Inc., Fremont, CA (US)

( * ) Notice: Subject to any disclaimer, the term of this patent is extended or adjusted under 35 U.S.C. 154(b) by 1270 days.

(21) Appl. No.: 09/721,012

(22) Filed: Nov. 21, 2000

Related U.S. Application Data

(63) Continuation-in-part of application No. 09/415,295, filed on Oct. 8, 1999.

(51) Int. Cl.
*G06F 15/16* (2006.01)

(52) U.S. Cl. .................. 709/203; 709/217; 715/701; 715/704; 715/727; 715/728

(58) Field of Classification Search ............... 709/203, 709/217–219; 379/93.02; 715/700–704, 715/727–730
See application file for complete search history.

(56) References Cited

U.S. PATENT DOCUMENTS 5,884,262 A * 3/1999 Wise et al. ............... 704/270.1
6,018,710 A * 1/2000 Wynblatt et al. .......... 704/260
6,188,985 B1 * 2/2001 Thrift et al. ............... 704/275

(Continued)

FOREIGN PATENT DOCUMENTS

WO      99 28897 A   *   6/1999

(Continued)

OTHER PUBLICATIONS

Kreller B. et al "UMITS: A middleware Architecture and Mobile API Approach," IEEE Personal Communications, U.S. IEEE Communications Society, vol. 5, No. 2, pp. 32-38 (Apr. 1, 1998).*

*Primary Examiner*—Ario Etienne
*Assistant Examiner*—LaShonda Jacobs
(74) *Attorney, Agent, or Firm*—Koestner Bertani LLP; Mary Jo Bertani

(57) ABSTRACT

A mobile information network browser device with audio feedback and adaptive personalization capability that is capable of transmitting a request for information via a wireless communication interface from one or more servers in an information network. The browser device further includes an audio interface capable of receiving data from the wireless communication interface that is responsive to the request for information. The browser device interfaces with a wireless communication network so that it may be used in a mobile vehicle, such as an automobile. The order in which individual pieces of content in the requested information is presented to the user is modified based on indicators of the user's interest in a topic during previous sessions. Such indicators can include whether the user input a command to skip, fast-forward, rewind, or request more detail about a category, subcategory, or topic of information. The adaptive personalization capability can also prevent redundant content from being presented.

50 Claims, 15 Drawing Sheets

U.S. PATENT DOCUMENTS

| | | | | |
|---|---|---|---|---|
| 6,501,832 B1 * | 12/2002 | Saylor et al. | ............ | 379/88.04 |
| 6,539,080 B1 * | 3/2003 | Bruce et al. | ............. | 379/88.17 |
| 6,587,822 B2 * | 7/2003 | Brown et al. | ............... | 704/275 |
| 6,594,484 B1 * | 7/2003 | Hitchings, Jr. | ........... | 455/414.1 |
| 6,600,736 B1 * | 7/2003 | Ball et al. | ................... | 370/352 |
| 6,600,898 B1 * | 7/2003 | De Bonet et al. | .......... | 455/3.04 |
| 6,870,910 B1 * | 3/2005 | Armstrong et al. | ...... | 379/88.22 |

FOREIGN PATENT DOCUMENTS

| | | | | |
|---|---|---|---|---|
| WO | 99 43111 A | * | 8/1999 | |
| WO | 99 48088 | * | 9/1999 | |

* cited by examiner

- Arizona Diamondbacks Update
- Utah Jazz Updat
- Vancouv r Grizzlies Update
- Denver Nuggets Update
- Atlanta Hawks Update
- Miami Heat Update
- L.A. Lakers Update
- Seattle Sup rsonics Update
- Portland Trailblazers Update
- CNN Sports News
- Yahoo Sports Reuters
- InfoSpace Sports

 "weather"  262

- Asheville, NC
- Birmingham, AL
- Charlotte, NC
- Cleveland, OH
- Denver, CO
- Greensboro, NC
- Indianapolis, IN
- Memphis, TN
- Minneapolis, MN
- New York, NY
- Orlando, FL
- Pittsburgh, PA
- Raleigh, NC
- San Antonio, TX
- Scranton/Wilkes Barre, PA
- Tampa/St. Pete., FL News Finance Stocks Email Sports Weather

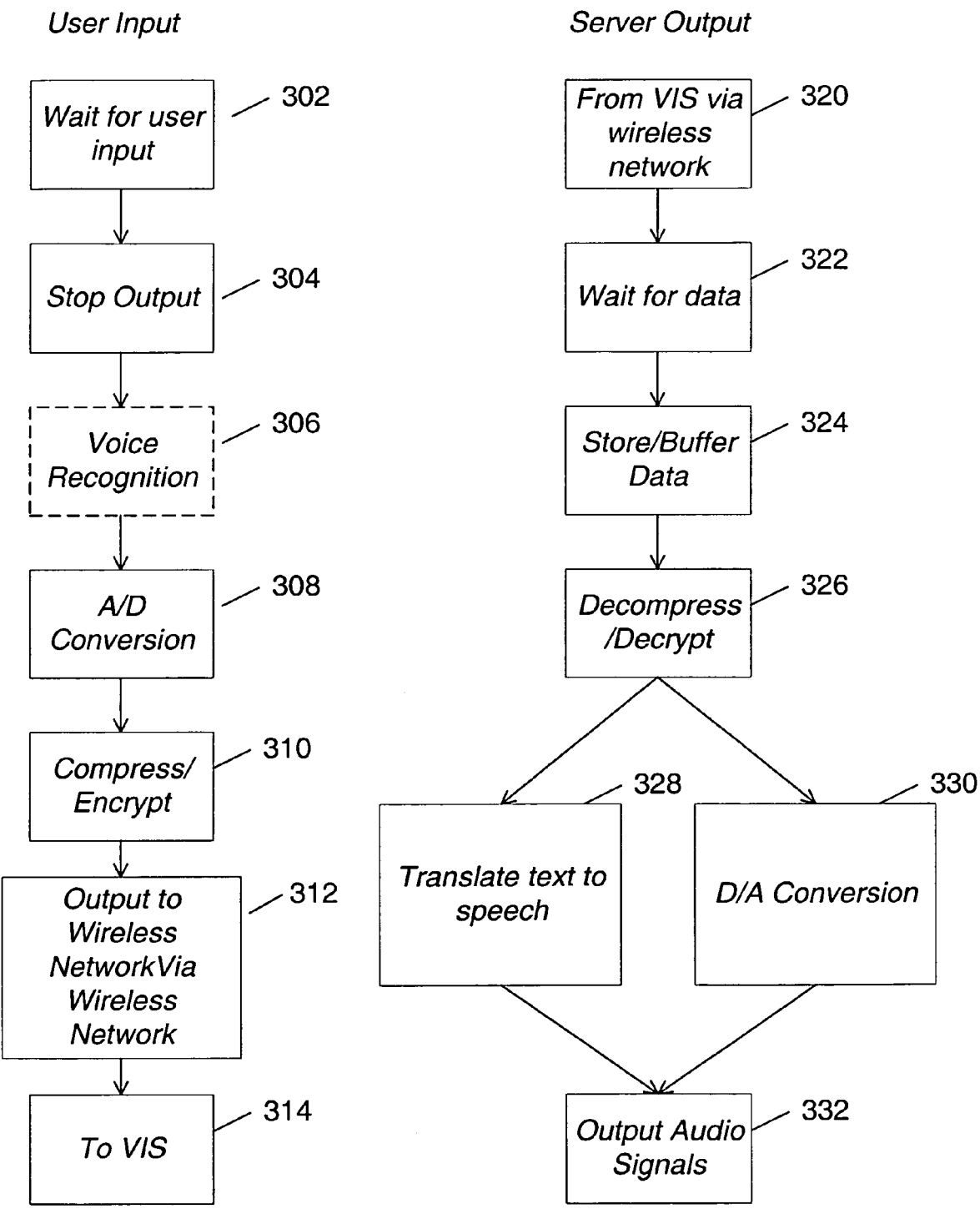
*Fig. 3a*     *Fig. 3b*

PORTABLE BROWSER DEVICE WITH ADAPTIVE PERSONALIZATION CAPABILITY

CROSS REFERENCE TO RELATED APPLICATION

This application is a continuation-in-part of U.S. patent application Ser. No. 09/415,295, entitled "Portable Browser Device With Voice Recognition And Feedback Capability," (hereafter "the '295 application"), filed Oct. 8, 1999, which application is assigned to the assignee of the present invention and is hereby incorporated herein by reference in its entirety.

BACKGROUND OF THE INVENTION

A number of different information networks are available that allow access to information contained on their computers, with the Internet being one that is generally known to the public. While the Internet is used herein as an example of how the present invention is utilized, it is important to recognize that the present invention is also applicable to other information networks. A brief overview of concepts associated the world-wide web, web servers, and web browsers that are pertinent to understanding the present invention is presented here.

An example of a typical Internet connection found in the prior art is shown in FIG. 1. A user that wishes to access information on the Internet typically has a computer workstation 112 that executes an application program known as browser 114. Workstation 112 establishes a communication link 116 with web server 118 such as a dial-up wired connection with a modem, a direct link such as a T1 or ISDN line, or a wireless connection through a cellular or satellite network. When the user enters a request for information by entering commands in browser 114, workstation 112 sends a request for information, such as a search for documents pertaining to a specified topic, or a specific web page to web server 118. Each web server 118, 120, 122, 124 on the Internet has a known address which the user must supply to the browser 114 in order to connect to the appropriate web server 118, 120, 122, or 124. If the information is not available on the user's web server 118, a central link such as backbone 126 allows web servers 120, 122, 124 to communicate with server 118 to supply the requested information. Because web servers 118, 120, 122, 124 can contain more than one web page, the user will also specify in the address which particular web page he wants to view. The web servers 118, 120, 122, 124 execute a web server application program which monitors requests, services requests for the information on that particular web server, and transmits the information to the user's workstation 112.

In the prior art, a web page is primarily visual data that is intended to be displayed on the display device, such as the monitor of user's workstation 112. When web server 118 receives a web page request, it will transmit a document, generally written in a markup language such as hypertext markup language (HTML), across communication link 116 to the requesting browser 114. Communication link 116 may be one or a combination of different data transmission systems, such as a direct dial-up modem connected to a telephone line, dedicated high-speed data links such as T1 or ISDN lines, and even wireless networks which transmit information via satellite or cellular networks.

When web server 118 receives a search request, the request is sent to the server containing the search engine specified by the user. The search engine then compiles one or more pages containing a list of links to web pages on other web servers 120, 122, 124 that may contain information relevant to the user's request. The search engine transmits the page(s) in markup language back to the requesting web server. This entire system of web pages with links to other web pages on other servers across the world is known as the "World Wide Web".

As the capabilities, usefulness, and amount of information available on the Internet increases, it is desirable to have the ability to access the Internet from any location at any time. One known solution is to use wireless mobile communication systems with portable devices such as laptop or palmtop computers. The user enters commands and requests using a keyboard or other known data entry device. The results of the request/command are then output to the device's display. The wireless system transfers data between the server and the user's portable device while the user is free to move about an area.

There are situations, however, when it would be more convenient for the user to enter commands and requests orally without being required to enter the information through a keyboard or other entry device, and to receive the information verbally without looking at a display for the results.

Systems known in the prior art are capable of providing embedded microprocessor systems that respond to a verbal request such as providing audio readout of sensed data, such as vehicles that include audio output of RPM, fuel level, mileage rate, ambient air temperature, and navigation instructions to a destination. It is also known that systems are being developed that are capable of delivering audio information in response to a user's verbal request to retrieve e-mail from an Internet account, or other information from subscription news services.

The system disclosed in the '295 application allows a user to customize information preferences ahead of time, and is capable of browsing virtually any address on an information network such as the Internet. The system in the '295 application is also capable of outputting information that arrives from an information network in markup language or speech format. A user on the system typically sets up one or more categories of information to be received, such as news, sports, and weather. One or more subcategories may be listed for each category. For example, the news category may have a list of news sites from which information is to be received. Currently, the user can interactively, through audio commands or commands entered through a manual data input device, rearrange the order of the categories, as well as the order of the subcategories within categories, from which information is received.

A search engine generates a playlist based on the information available in the categories and subcategories, and from the other sources specified by the user. In some situations, a user may be interested in regularly receiving information on an array of topics in the order in which the categories, subcategories, and other sources of information are arranged. In other situations, a user may wish to have the playlist modified according to their preferences without being required to reprogram the list of categories, subcategories, and other user-specified sources of information. It is therefore desirable to provide a system that presents a brief headline for the categories, subcategories, and each piece of information. It is also desirable for the system to allow users to skip over categories, subcategories, and individual pieces of information after hearing the headline or any portion of the content. It is further desirable to provide a system that monitors the user's actions, and modifies the playlist based on the user's previous actions. The system would thus determine which information to present and re-prioritize the order in which information is presented based on how interested the user appeared to be in the information during previous sessions.

SUMMARY OF THE INVENTION

A mobile information network browser device with audio feedback and adaptive personalization capability that is capable of transmitting a request for information via a wireless communication interface from one or more servers in an information network. The browser device further includes an audio interface capable of receiving data from the wireless communication interface that is responsive to the request for information. The browser device interfaces with a wireless communication network so that it may be used in a mobile vehicle, such as an automobile. The requested information that is presented and the order in which it is presented to the user is determined based on indicators of the user's interest in a topic during previous sessions. Such indicators can include whether the user input a command to skip, fast-forward, rewind, or request more detail about a category, subcategory, or topic of information. The adaptive personalization capability can also prevent redundant content from being presented.

In one embodiment, a mobile browser system with adaptive personalization and audio feedback capability for retrieving information from an information network is provided. The browser system includes a wireless communication interface that transmits data to one or more of the plurality of network servers, receives user input, and receives data from one or more of the plurality of network servers. The data transmitted to the network servers includes a request for information, and the data received from the includes information responsive to the request. The browser system also includes an audio interface operable to receive data from the wireless communication interface.

The browser device also includes an adaptive personalization module that monitors the user input during sessions with the browser system, and determines the order for presenting the requested information based on previous user input. A user's model is updated based on the previous user input and the model is used to determine whether a piece of content is presented and the order for presenting each piece of content in the requested information. User actions such as skipping playback, fast-forwarding or rewinding playback, and requesting more detail on the requested information, are monitored to determine a user's interest in the topic of the story.

The adaptive personalization module also generates a representation of each piece of content in the requested information, and determines the order of presentation of the requested information based on the user's model and the representation. The adaptive personalization module further determines whether the requested information is redundant compared to information presented during a previous session and compared to one or more other pieces of content in the requested information.

In another embodiment, a method for browsing an information network via a wireless communication network and receiving responsive information in audio format using a mobile audio device, is provided. The method includes:

transmitting input from a user via the wireless communication network to a data processor;

processing the input to determine when the user enters a valid browsing command;

transmitting the browsing command to a server on the information network;

receiving the responsive information from the server;

adaptively determining the order for presenting the responsive information based on user input during one or more previous sessions with the mobile audio device;

formatting the responsive information in audio format;

transmitting the formatted audio information to the mobile audio device via the wireless communication network;

generating an audio output signal in the mobile audio device; and transmitting the audio output signal to an audio output device.

Adaptively determining the order for presenting the responsive information can include updating a user's model based on the previous user input, and determining the order for presenting the responsive information based on the user's model. Input that is monitored includes skipping, fast-forwarding, rewinding, and requesting more detail for a particular piece of content in the responsive information.

The topic of a piece of content is determined by generating a representation, such as a "bag of words." The order of presentation of each piece of content in the responsive information is determined based on the user's model and the representation, which indicates the topic of the content.

The device and method of the present invention thus allows users to skip over categories, subcategories, and individual pieces of information after hearing the headline or any portion of the content. The user's actions are automatically monitored, and the playlist can be modified automatically based on the user's previous actions. The information to be presented and the order in which it is presented is thus based on how interested the user appeared to be in the information during previous sessions. Redundant information is also reduced based on the topics of the pieces of content, as well as topics presented to the user during previous sessions. Relevant information is thus presented to the user in the order of most interest without requiring the user to explicitly re-prioritize topics or delete redundant content.

The foregoing has outlined rather broadly the objects, features, and technical advantages of the present invention so that the detailed description of the invention that follows may be better understood.

BRIEF DESCRIPTION OF THE DRAWINGS

FIG. 3a is a flowchart diagram of logic for handling user input in a mobile audio device in accordance with the present invention.

FIG. 3b is a flowchart diagram of logic in a mobile audio device for handling information requested from an information network in accordance with the present invention.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The method and apparatus of the present invention is applicable to mobile and portable devices that are capable of accessing a computerized information network. The present invention provides a mobile device that allows the user to access an information network while the user is mobile, to request information using voice commands, and to receive information responsive to the request in audio format. The present invention thereby alleviates the need for the user to divert his or her attention to enter requests for information using a keyboard or other device, or to view a display to read the information returned as a result of the request.

Figure 2:
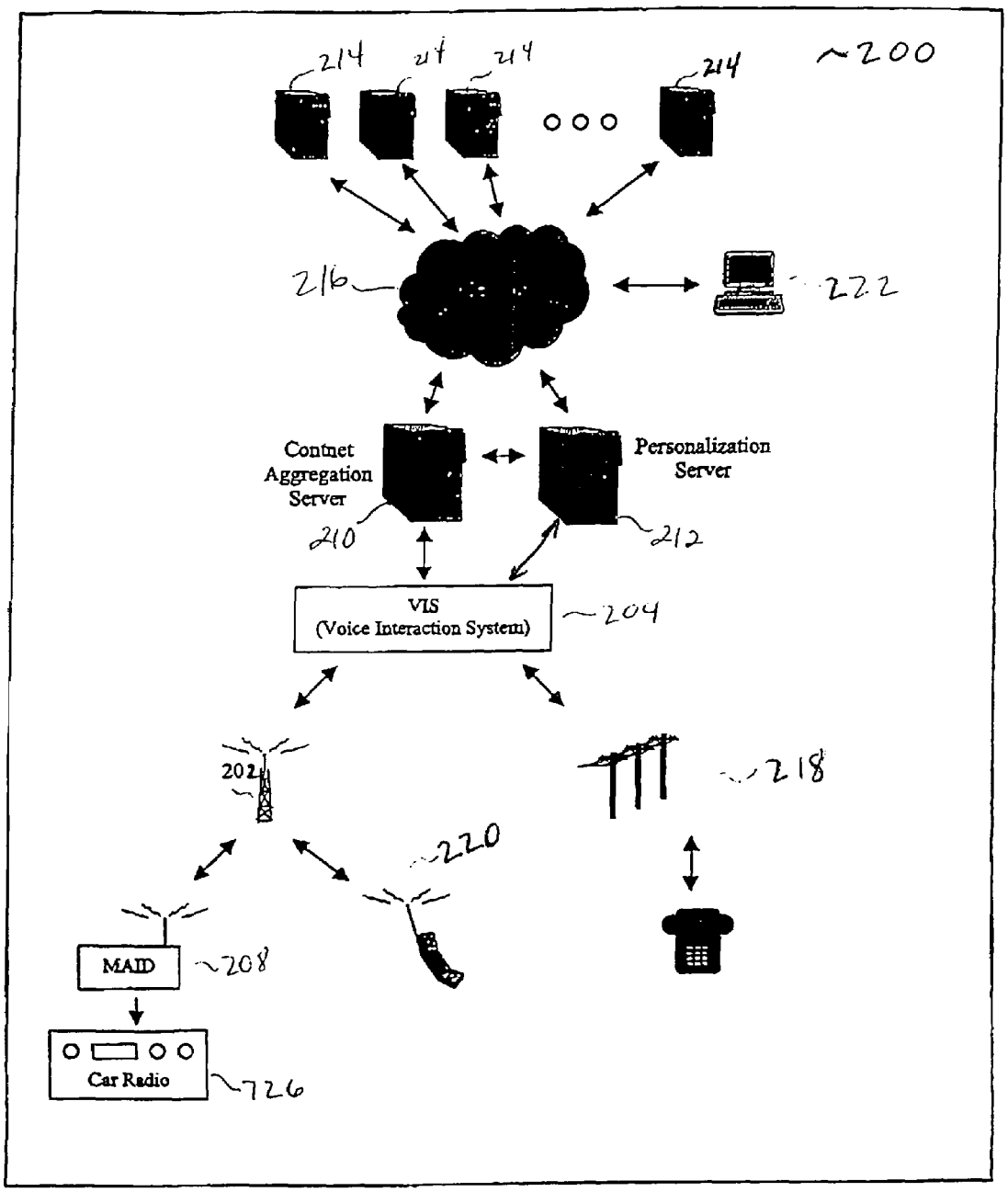
FIG. 2 is a diagram of one embodiment of a system for accessing an information network in accordance with the present invention.

FIG. 2 shows an embodiment of the present invention for a mobile information network browser system 200 with voice recognition and feedback capability, and adaptive personalization. Browser system 200 includes wireless communication network 202, voice interaction system (VIS) 204, and mobile audio device 208, content server 210, personalization server 212, remote servers 214, information network 216, conventional telephone system 218, cellular telephone system 220, and workstation 222. VIS 204 incorporates a voice recognition system that deciphers a user's voice input and recognizes when a user inputs a browser command.

There are a number of alternatives for providing a user interface for controlling information network browser 114 and retrieving information from the information system 216 that may be utilized with the present invention. In one embodiment, content server 210 incorporates VIS 204 and voice navigation commands that are transmitted to and executed by content server 210. In another embodiment, VIS 204 is a separate system that resides outside of any of the other components of mobile information network browser system 200. In another embodiment, VIS 204 is built into a component of wireless communication network 202 such as cellular telephone system 220, and transmits commands to content server 210, which executes the command. In another embodiment, mobile audio device 208 includes VIS 204 and transmits recognized commands to content server 210.

Browser 114 performs functions including navigation and data output. Navigation determines what information the user is interested in retrieving. Data output presents the retrieved information in a legible and/or audible format to the user. In the present invention, the output is usually audible. However, another embodiment of the present invention includes the capability to additionally output the responsive information to a display monitor, text file, printer, and/or facsimile device. In an embodiment of the present invention wherein mobile audio device 208 includes voice recognition, mobile audio device 208 also performs navigation functions of browser 114 to determine which commands to send to content server 210 to retrieve the requested information. In this embodiment, control switches, such as buttons and dials, are provided to allow the user to enter navigation commands and browser control selections. Control switch selections are converted to information requests or browser controls by program instructions in mobile audio device 208 and transmitted as commands to content server 210 via wireless communication network 202.

It is important to note that a user's listening preferences and requests may be preprogrammed, or set to default values, and therefore user input is not required for the present invention to request information from information network 216. The user may, however, override preprogrammed and default requests and settings using voice input. The user may also provide voice input to reset information requests to default values and/or to request information in addition to the information requested by the preprogrammed or default settings. As used herein, the term "requested information" pertains to information that is requested by mobile audio device 208, whether the request is the result of user input or preselected/default settings for mobile audio device 208.

Figure 1:
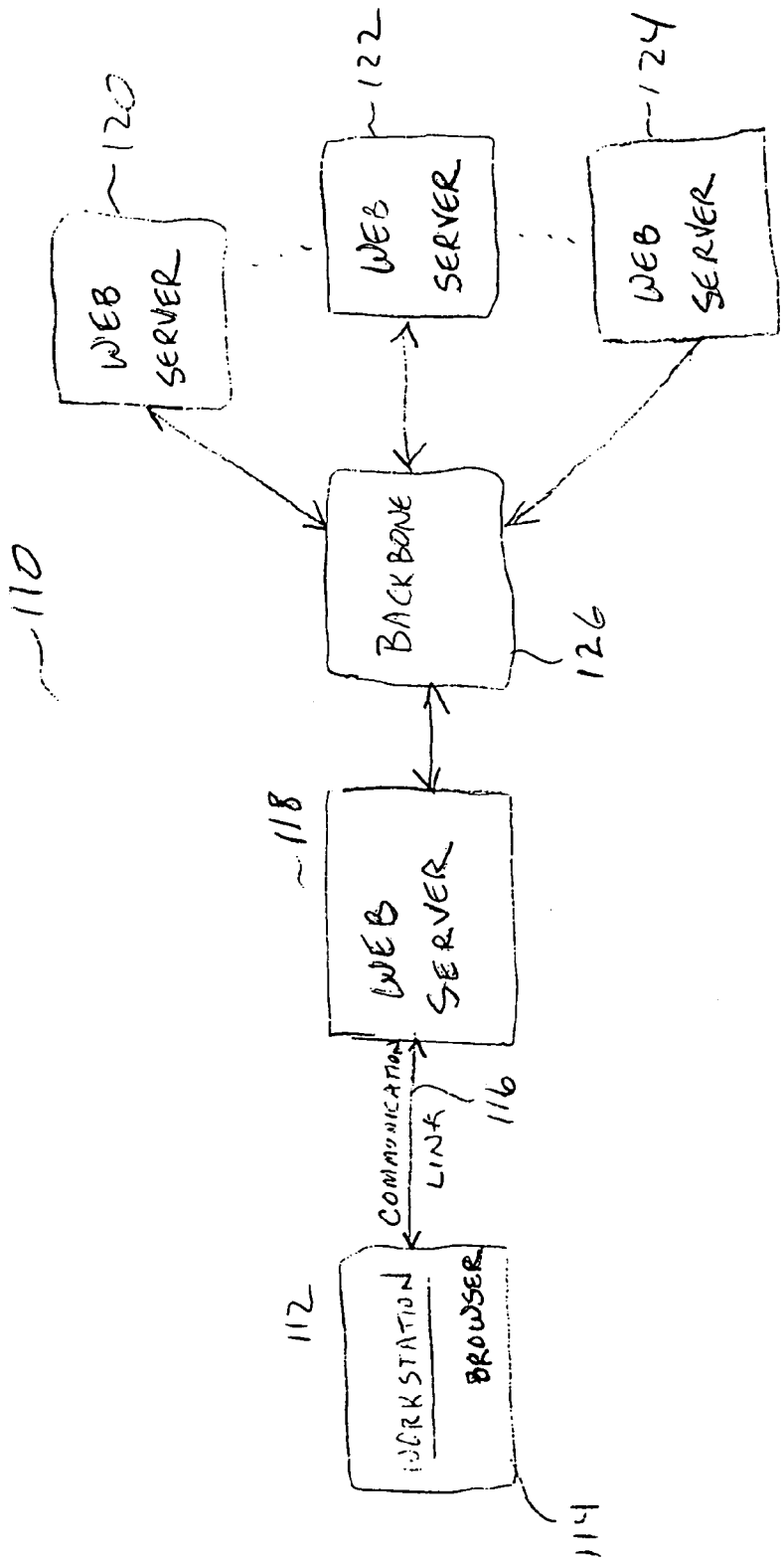
FIG. 1 is a block diagram of a system for accessing an information network found in the prior art.
Figure 2A:
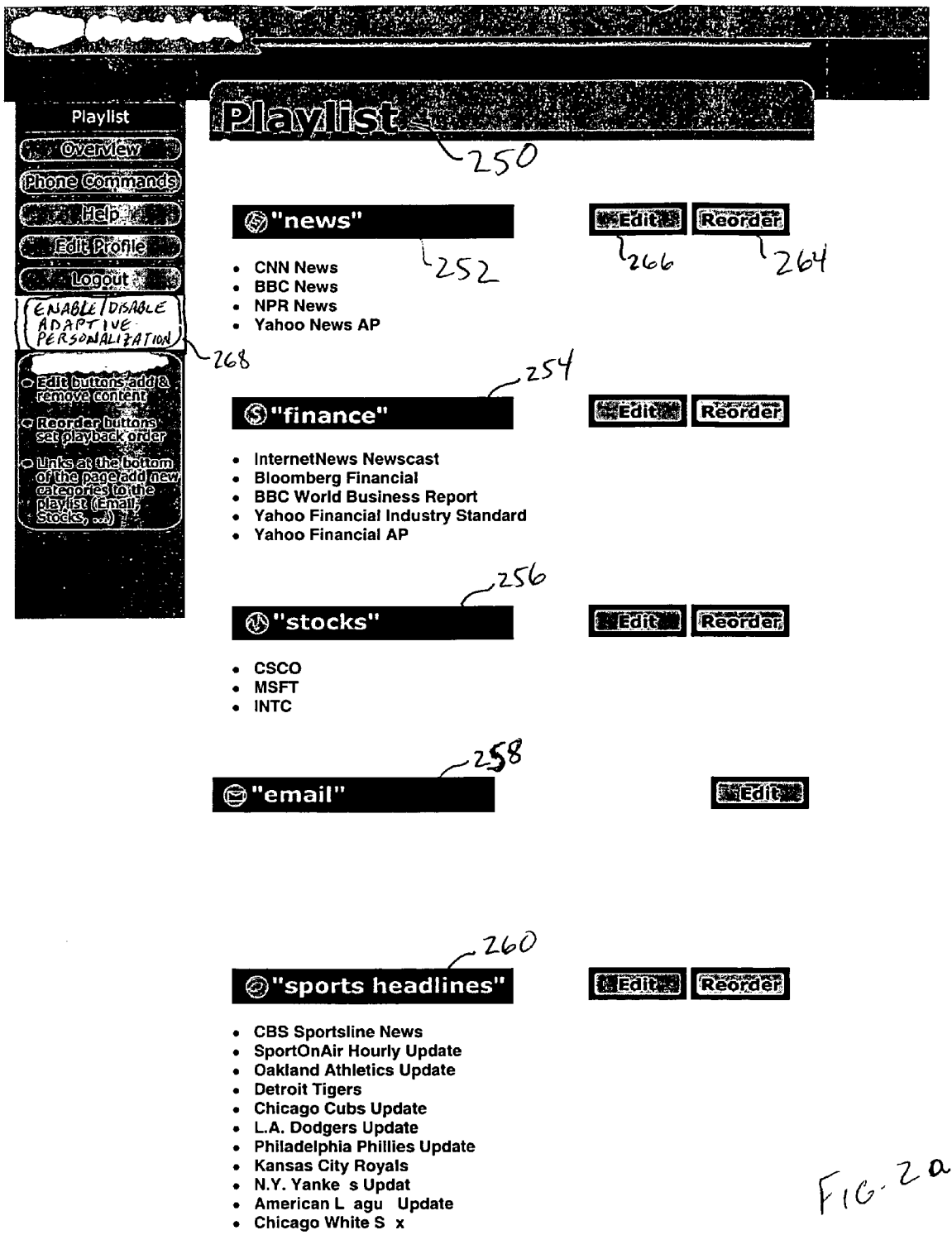
FIG. 2a is an example of a user interface for modifying a playlist.

Referring to FIGS. 2 and 2a, FIG. 2a shows an example of a user interface for allowing the user to customize their playlist 250 from a device with a display, such as workstation 222 (FIG. 2). It should be noted, however, that the user may also enter preferences using other interface means such as conventional telephone system 218 or cellular telephone system 220 through information network 216. A playlist 250 is stored in a user model in personalization server 212 for each user. The playlist 250 includes one or more sources of information the user wants to access. A location, or address, in information network 110 (FIG. 1) is associated with each source of information in playlist 250 in the user's model. The addresses can correspond to sources of information that are accessible with or without a subscription or user fee. When a fee is required to access a particular source of information, a user login name and/or password is also associated with the source of information in the user's model.

Playlist 250 includes categories, such as, for example, "news" category 252, "finance" category 254, "stocks" category 254, "email" category 256, "sports headlines" category 258, and "weather" category 260. Other categories may be included in the list in addition to, or instead of, those shown in FIG. 2a. A category may include one or more subcategories. For example, "news" category 252 is shown including four subcategories, namely, CNN News, BBC News, NPR News, and Yahoo News AP. The order in which information in the subcategories is presented can be changed by selecting a corresponding reorder option, such as reorder option 264 for the "news" category 252. The reorder option allows the user to put one or more subcategories ahead of or behind other subcategories. The list of subcategories may be edited by selecting a corresponding edit option, such as edit option 266, to remove and/or insert subcategories. The reorder option and edit option are shown as examples of ways for a user to personalize playlist 250. Other mechanisms and options for personalizing playlist 250 may be included in addition to, or instead of, those shown in FIG. 2a. These other mechanisms and options include voice command interfaces.

Another alternative for modifying playlist 250 is to adaptively personalize playlist 250 based on the user's actions during previous sessions with mobile audio device 208. FIG. 2a shows enable/disable adaptive personalization option 268 as an example of a mechanism that allows the user to enable and disable the adaptive personalization feature of personalization server 212 (FIG. 2). Other mechanisms and interfaces for enabling and disabling adaptive personalization option 268 can be included in addition to, or instead of, a graphical user interface as shown in FIG. 2a. These other mechanisms and interfaces include voice command interfaces. The functions performed when adaptive personalization is enabled or disabled are further discussed hereinbelow in connection with the discussion of FIGS. 5 and 5a.

FIG. 3a shows a flowchart of one embodiment of logic that may be used in mobile audio device 208 for handling input from a user to browse information available from information network 216. Referring now to FIGS. 2 and 3a, program instructions associated with mobile audio device 208 wait for input from a user as shown at block 302. When input is received, mobile audio device 208 stops outputting information from previous requests (if applicable), as shown at block 304. When mobile audio device 208 includes voice recognition capability (as shown by dashed box 306), it processes the user's speech to determine whether a valid command was entered and converts the analog signal to digital samples of the analog signal at a prescribed rate as shown in block 308 to generate a processed signal representing the user's voice input. Mobile audio device 208 may also include capability to compress and/or encrypt the digital samples of the user's input as shown in block 310, using one of any known compression and/or encryption algorithms. The processed signal representing the user's input is output to wireless communication network 202 as shown in block 312. Wireless communicate network 202 then transmits the processed signal to VIS 204 as shown in block 314. Once the user input signals are transmitted, the program instructions loop back to block 302 and wait for more input from the user.

Referring now to FIGS. 2 and 3b, FIG. 3b shows a flowchart of one embodiment of logic that may be used in mobile audio device 208 for providing requested information from servers 210, 212, 214 in the form of audio output to the user. Information responsive to a user's request is transmitted from servers 210, 212, 214 to VIS 204. As shown in block 320, VIS 204 transmits the information in an appropriate format to mobile audio device 208 via wireless communication network 202. Logic contained in program instructions in mobile audio device 208 suspend execution of further program instructions related to processing responsive information until the responsive information is received, as shown in block 322. As the responsive information is received, it is buffered, or stored, as shown in block 324, until it is requested for data processing. Mobile audio device 208 is capable of processing data at a rate that minimizes discontinuity or interruptions in outputting the information to audio output devices. When the responsive information is compressed and/or encrypted, it is correspondingly decompressed and/or decrypted in mobile audio device 208 as shown in block 326. The responsive information comprising textual data is then translated from text to speech, and then transmitted to an audio output device as shown in blocks 328 and 332. Responsive information comprising digital voice data is converted from digital to analog signals which are then transmitted to an audio output device as shown in blocks 330 and 332. Once the analog audio output signals are transmitted, the program instructions loop back to block 322 and wait for data from VIS 204.

Figure 4:
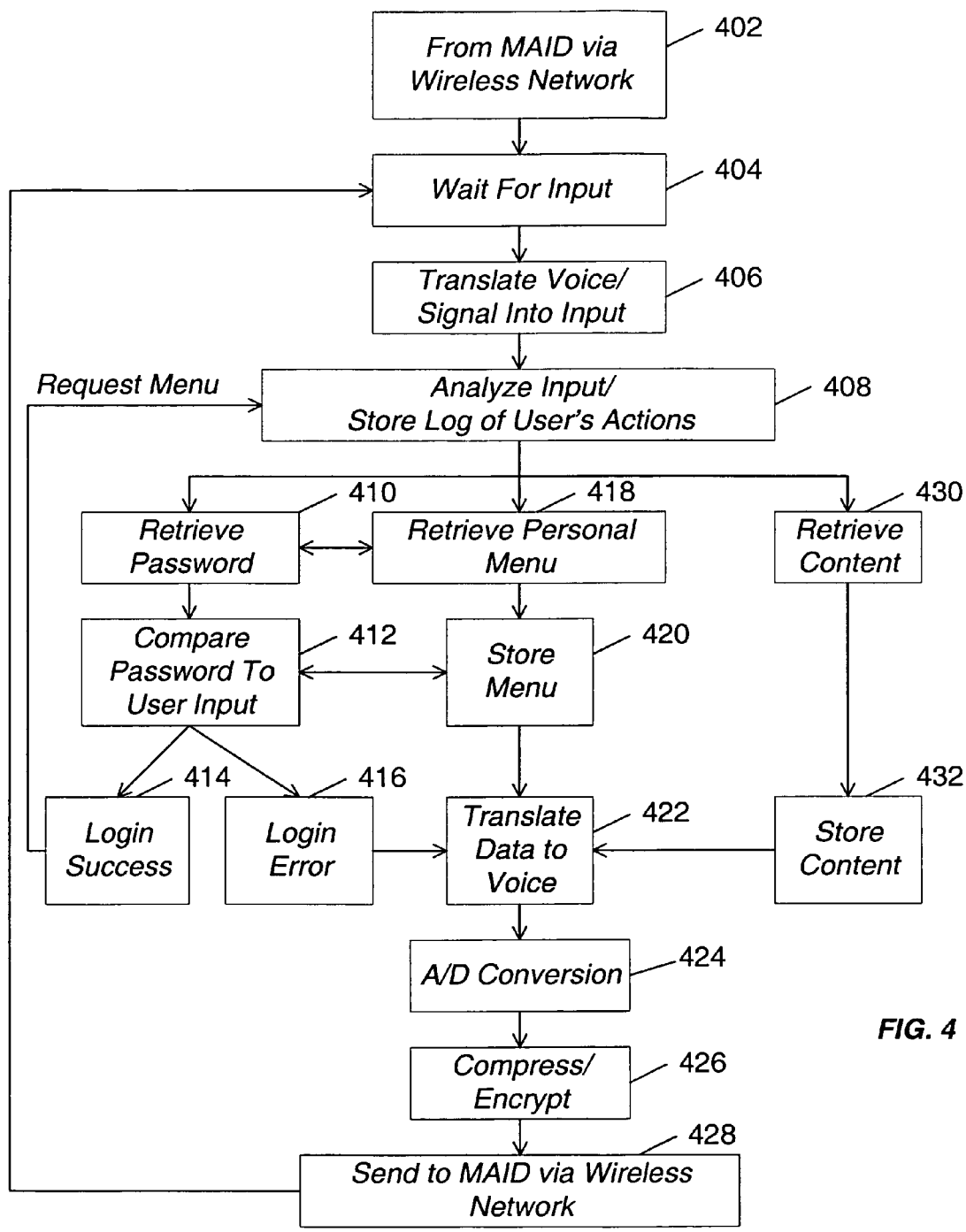
FIG. 4 is a flowchart diagram of logic in a voice interaction system for accessing an information network in accordance with the present invention.

Referring now to FIGS. 2 and 4, FIG. 4 shows a flowchart 400 of one embodiment of logic that is used in VIS 204. The logic is implemented in program instructions that are executed to allow a user to log in and enter personal information in personalization server 212, recognize voice commands, transmit the appropriate data selections and navigation commands to content server 210, receive responsive information from content server 210, and transmit the responsive information to mobile audio device 208 via wireless communication network 202. As shown in block 402, mobile audio device 208 transmits user input to VIS 204 via wireless communication network 202. Logic contained in program instructions in VIS 204 suspends execution of further program instructions related to processing user input until the user input is received, as shown in block 404. As the user input is received, it is translated from voice to an input signal in block 406.

In Block 408, the input signal is analyzed to determine what action the user wants browser system 200 to perform. A copy of the input signal is also stored in a log of user actions, as shown in block 408. The log is available to personalization server 212 to use in adaptively personalizing the user's playlist based on actions taken by the user, as further described herein. The appropriate program instructions are then executed corresponding to the input by the user as follows. When a user first accesses VIS 204, the system verifies that the user is authorized to access the system. This may be accomplished in one of several known ways. In one embodiment, each user is assigned a password which must be entered and verified before access to the system is granted. One example of an implementation for verifying a user's password is shown in blocks 410 through 416. Specifically, on first access, the user's password is retrieved from personalization server 212 as shown in block 410, and compared to the password entered by the user, as shown in block 412. If the user's input matches the retrieved password, the user is successfully logged in and control passes from block 414 back to block 408 to request the user's main menu. Note that control is passed to block 408 on the first access to retrieve the main menu, whether it is a user's customized menu or a default menu. If the passwords do not match, a login error is issued as shown in block 416, and a notice can be output to inform the user that the login was not successful. Optionally, the user may be prompted again, up to a predetermined number of times, to enter a password.

Once control passes to block 418, the user's personalized menu is retrieved from personalization server 212, and stored in memory as shown in block 420. Program instructions, corresponding to block 422 and 424, translate the stored menu from text data to digital voice data. The digital voice data is then compressed and/or encrypted in block 426 and transmitted to mobile audio device 208 via wireless communication network 202 as shown in block 428. Once the digital data is transmitted, control is passed to block 404 to wait for input from the user. Control is passed to block 418 whenever the user inputs a menu request for either the main menu or one of a variety of sub-menus, which the user may also personalize.

When the user enters a request for information, control is passed from block 408 to block 430, wherein VIS 204 issues a request for information to content server 210. The requested information is retrieved from content server 210, or from servers 214 if the requested information does not reside on content server 210. The requested information, also referred to as content, may be stored by VIS 204 for subsequent access without requiring another request for the content from content server 210, as indicated by block 432. Program instructions, corresponding to blocks 422 and 424, translate the requested information from text data to digital voice data. The digital voice data is then compressed and/or encrypted in block 426 and transmitted to mobile audio device 208 via wireless communication network 202 as shown in block 428. Once the digital data is transmitted, control is passed to block 404 to wait for input from the user.

Figure 5:
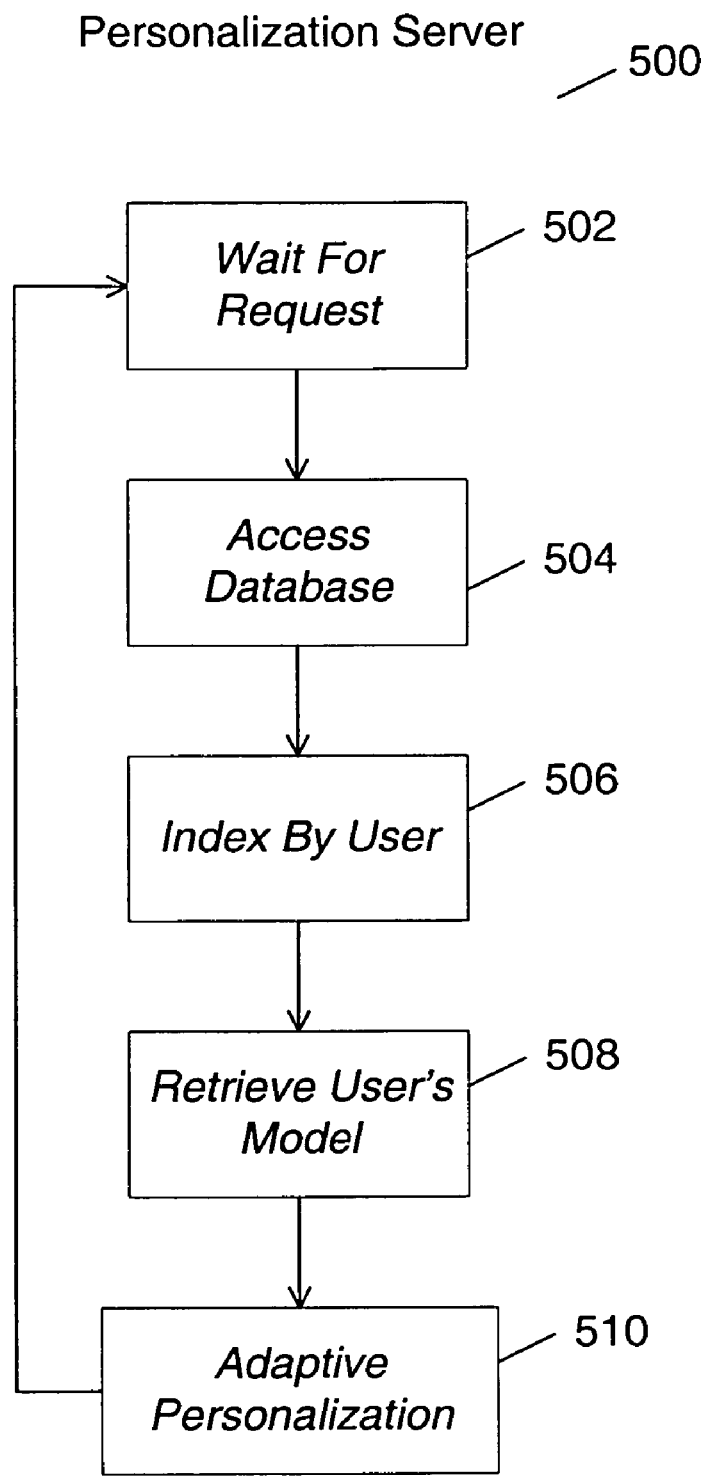
FIG. 5 is a flowchart diagram of logic for entering personal information in a personalization server in accordance with the present invention.

Referring now to FIGS. 2 and 5, FIG. 5 shows personalization logic 500 implemented in program instructions on personalization server 212. Program instructions corresponding to block 502 suspend execution of further program instructions to access personal information until a request is received from VIS 204. Once a request is received, program instructions access a database of user information as shown in block 504. The user's information and personalized settings, also referred to as the user's model, are retrieved from the database by indexing through the information based on the user's identification as shown in blocks 506 and 508.

Figure 5A:
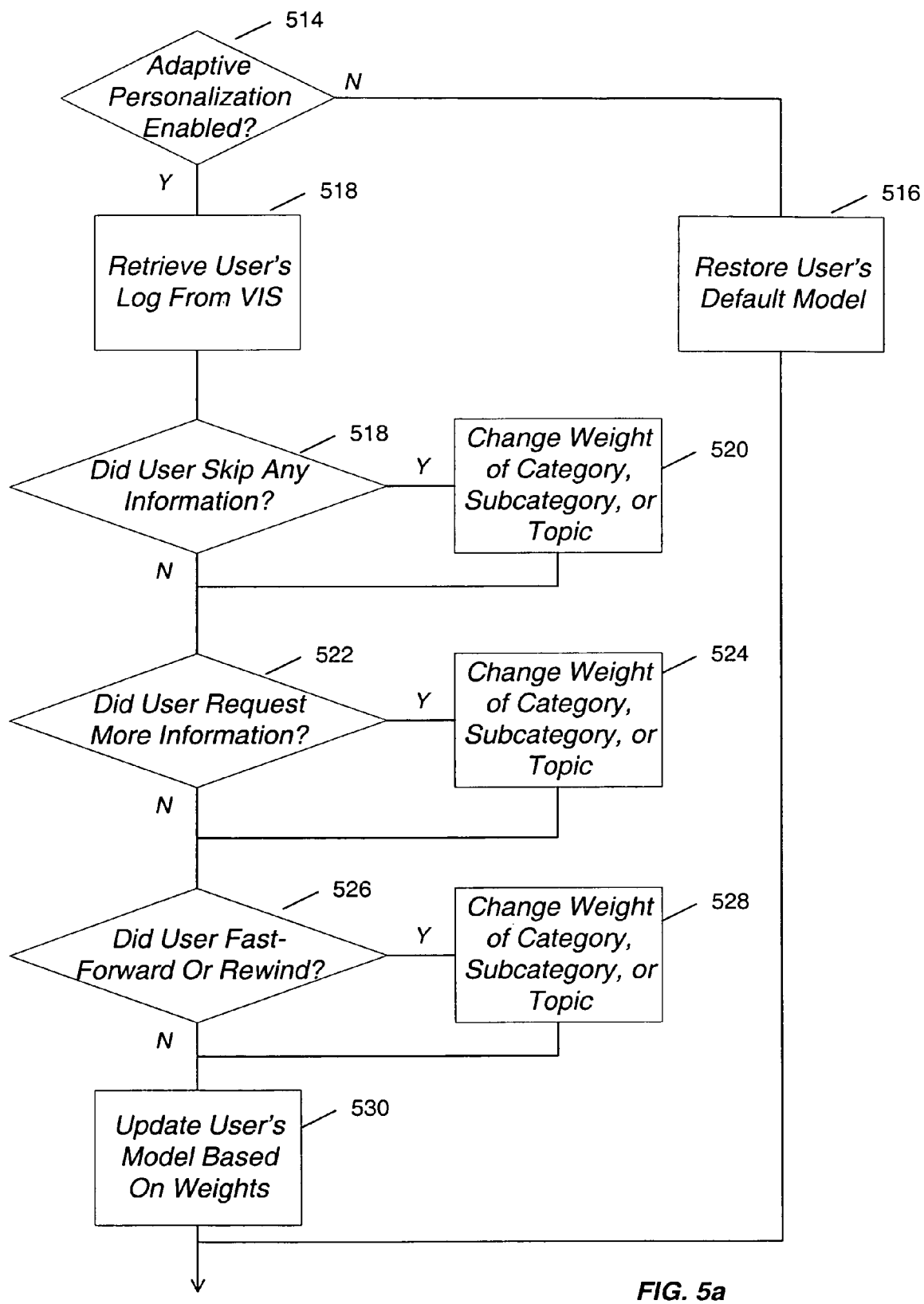
FIG. 5a is a flowchart diagram of logic for adaptively personalizing a user's model in accordance with the present invention.

The user's model is updated using adaptive personalization logic, as represented by block 510, in accordance with the present invention. FIG. 5a shows one embodiment of processes performed by adaptive personalization logic when adaptive personalization option 268 (FIG. 2a) is enabled as well as when it is disabled. When adaptive personalization option 268 is disabled, the user's default model is restored, as indicated by block 514. The term "default model" refers to the model that was being used before the adaptive personalization option 268 was enabled. The user can also be provided with the option of choosing between two or more default models, if more than one previously used model is available.

When adaptive personalization option 268 is enabled, block 518 indicates that the user's log is retrieved from VIS 204 (FIG. 2). The user's log includes a record of all actions and commands issued by the user while interacting with browser system 200 (FIG. 2), along with a record of the category, subcategory, and topic of the content that was being played back when the action was taken or the command was issued. Playback of content can be preceded by an announcement of a headline or summary of each piece of content. Such actions and commands include, for example, fast-forwarding through a headline or through the content, skipping categories, subcategories, or individual pieces of content, and asking for additional information on a particular category, subcategory, or piece of content. Adaptive personalization logic infers the user's level of interest in a particular category, subcategory, or piece of content based on the user's interaction with browser system 200 while a headline or a piece of content is being played back.

The user's default model is used as a baseline to determine the user's relative interest in categories, subcategories, and topics. Adaptive personalization logic modifies the default user's model based on actions taken while a user was receiving information in a particular category, subcategory, and topic. The modifications can include reordering, deleting, and/or inserting categories, subcategories, and individual pieces of content based on the user's level of interest in the category, subcategory, and/or topic of the content. The adaptive personalization logic also determines whether content is redundant, and determines which of several pieces on content on a particular topic should be presented.

For example, referring to FIG. 2a, if a user fast-forwards or skips the news category 252 and the finance category 254 to get to the stocks category 256, then more priority will be given to the stocks category 256 in the future. This change in priority can result in rearranging the order in which the categories and/or subcategories are presented so that the stocks category 256 is presented before the news category 252 or the finance category 254. The threshold for determining when to modify the user model can be based on a variety of factors including the number of times the user skipped or only listened to a portion of a piece of content before fast-forwarding to the next topic, subcategory, or category. Another factor that can be used as a threshold for determining when to modify the user model includes the amount, or percentage, of information in a category, subcategory, or piece of content, that was presented before the user skipped to the next category, subcategory, or piece of content. The adaptive personalization logic also determines whether any of the content is redundant to determine which content will be presented as well as the order in which it will be presented. The redundancy factor is based on whether and how much of the content to be presented pertains to the same topic. The redundancy factor can also eliminate repetitive content or weight the priority for presenting it be based on whether content pertaining to the same topic was presented during a recent session. The factors are then used to weight each category, subcategory, topic, and/or piece of content.

An example of one implementation of such logic for adaptively personalizing the user's model is shown in FIG. 5a in blocks 518 through 530. In block 518, the logic determines whether the user skipped over any categories, subcategories, and/or topics in previous sessions. If so, logic in block 520 can change the weight, or priority, of the category, subcategory, and/or topic based on some predetermined threshold. The threshold can be based on criteria such as the number of times the category, subcategory, and/or topic was skipped, and/or, the percentage of the category, subcategory, and/or topic that was skipped. Note that the priority is typically lowered for a category, subcategory, or topic is skipped, and the change in priority can be proportional to the amount that is skipped.

In block 522, the logic determines whether the user requested more information for a particular category, subcategory, and/or topic in previous sessions. If so, logic in block 524 can change the weight, or priority, of the category, subcategory, and/or topic based on some predetermined threshold. The threshold can be based on criteria such as the number of times additional information for the category, subcategory, and/or topic was requested. Note that the priority is typically raised for a category, subcategory, or topic for which the user requests more information.

In block 526, the logic determines whether the user fast-forwarded or rewound playback of information in any categories, subcategories, and/or topics in previous sessions. If so, logic in block 528 can change the weight, or priority, of the category, subcategory, and/or topic based on some predetermined threshold. The threshold can be based on criteria such as the number of times the category, subcategory, and/or topic was fast-forwarded or rewound, and/or, the percentage of the category, subcategory, and/or topic that was fast-forwarded or rewound. Note that the priority is typically lowered when a user fast-forwards through a category, subcategory, or topic, and raised when a user rewinds a category, subcategory, or topic. The change in priority can be proportional to the amount that is fast-forwarded or rewound.

Figure 5B:
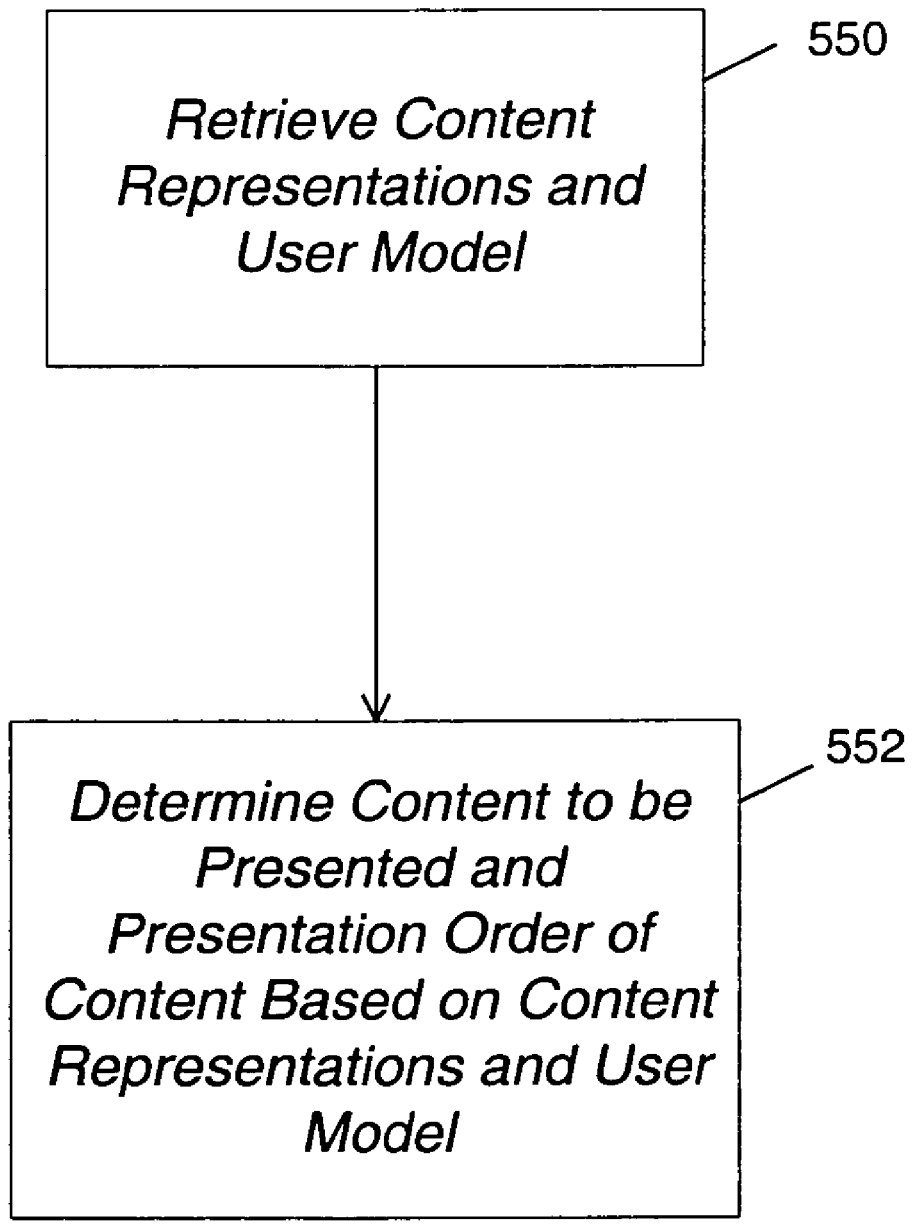
FIG. 5b is a flowchart diagram of logic for determining the content to be presented and the presentation order of the context in accordance with the present invention.

FIG. 5b shows a flowchart representing processes that can be included in VIS 204, personalization server 212, or content server 210 to determine which content gets presented and the order in which it is presented to the user once the user's model is provided. In block 550, representations of the requested information that was gathered by content server 210 are retrieved. Generation of the representations is further described hereinbelow in connection with the discussion of FIG. 6. In block 552, the content to be presented is determined, and each piece of content to be presented is ranked based on its category, subcategory, and/or topic and the associated priorities from the user's model. The information is ordered so that it is presented to the user based on the priorities available in the user's model.

Referring back to FIG. 5, once the user's model is generated, control is passed to block 502 to wait for another request for a user's model. The user's model can be accessed by VIS 204 and content server 210. Note that, depending on the implementation, some or all of the personalization program instructions in personalization server 212 can be implemented in mobile audio device 208, in VIS 204, and/or in content server 210 to tailor information requests and playback of the responsive information.

Figure 6:
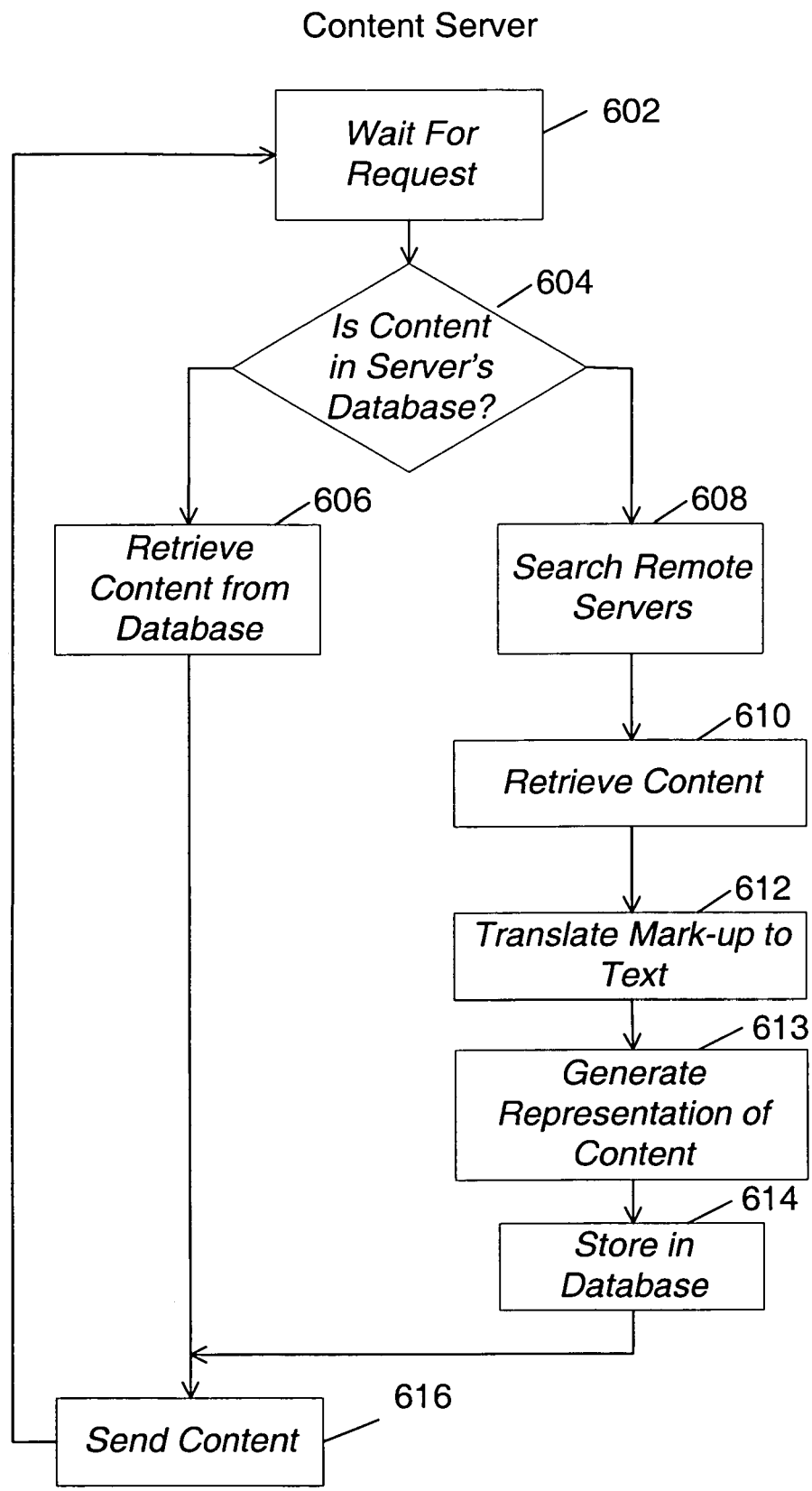
FIG. 6 is a flowchart diagram of logic for retrieving information from a content server in accordance with the present invention.

Referring now to FIGS. 2 and 6, logic implemented in program instructions for accessing information on content server 210 and remote servers 214, if necessary, is shown in FIG. 6. Program instructions corresponding to block 602 suspend execution of further program instructions to access information on servers 210, 214 until a request is received from VIS 204. Once a request for information is received, a check is made in block 604 to determine whether the information requested is found on content server's 210 database. If so, the information is retrieved from the database as shown in block 606. If not, program instructions on content server 210 issue a search for the information on remote servers 214 through information network 216, as shown in block 608. The information is retrieved from one or more servers 214, translated from a markup language, such as HTML, to text, as shown in blocks 610 and 612.

As indicated in block 613, the textual content is analyzed and distilled into a linguistic representation to determine one or more topics to which the piece of content pertains. One commonly used linguistic representation of textual content known in the art is the "bag of words" representation. In this approach, the content is represented as a list of the words that appear in it and as a vector of features, with a specific frequency assigned to each feature. In some cases the words are stemmed so that similar words map to a common root. For instance "learning", "learned", and "learns" would all map to the common root "learn". This frequency corresponds to the number of times each stemmed word occurs in the document. One or more topics to which the content pertains is determined by analyzing which words occur most frequently. Developing a user model and the bag-of-words representation to categorize text and decide how interesting a piece of information will be to a user is well known in the art, such as described in the paper entitled "Learning and Revising User Profiles: The identification of Interesting Web Sites" by Pazzani, M. and Billsus, D., Machine Learning, 27, 313–331, 1997. Another known method is described in the paper entitled "An Evaluation of statistical approaches to text categorization", by Yiming Yang, Journal of Information Retrieval, 1999, Vol 1, No. 1/2, pp 67–88.

The linguistic representation and the list of topics is included in a representation of the content. The content along with the representation of the content is stored in a database on content server 210, and then transmitted to the requesting server, such as VIS 204 or personalization server 212. Control then passes to block 602 to wait for another request for information.

Figure 7:
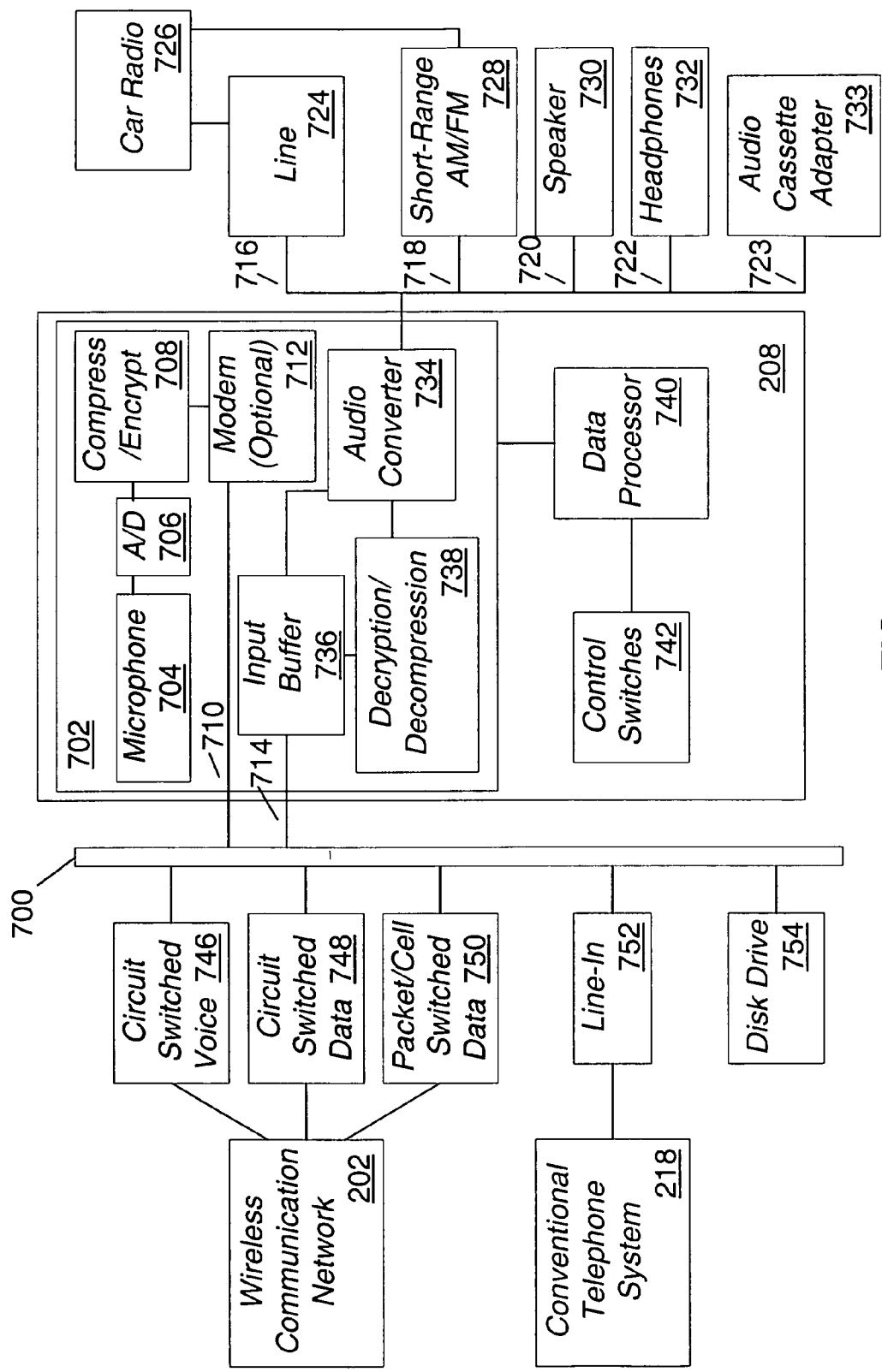
FIG. 7 is a block diagram of one embodiment of a mobile audio device in accordance with the present invention.

Referring now to FIGS. 2 and 7, FIG. 7 shows a block diagram of components included in one embodiment of mobile audio device 208 including communication interface 700 and audio interface 702. Mobile audio device 208 receives audio input signals through microphone 704 from a user, processes user input signals as required through analog to digital converter 706 and compression/encryption unit 708, and transmits processed user input signal 710 to communication interface 700. When conventional telephone system 218 is used, data is transferred via modem 712. Mobile audio device 208 also receives data signal 714 representing responsive information from communication interface 700 and processes it in audio interface 702 to generate one or more audio output signals 716, 718, 720, 722, 723 that are transmitted to corresponding audio output devices including, for example, signal line 724 direct-wired to car radio 726, wireless short-range radio 728 that broadcasts to car radio 726 on a selected channel, speaker 730, headphones 732, or cassette adapter 733, respectively.

Audio interface 702 exchanges input and output data signals with wireless communication network 202 via communication interface 700. Wireless communication network 202 may be one or a combination of any known wireless communication systems such as a satellite communication network or a cellular communication network that provides a communication link between VIS 204 and mobile audio device 208. Audio interface 702 includes audio converter 734, which receives from communication interface 700 through input buffer 736 information responsive to a user's request. The information responsive to the user's request may be specific information requested by the user, or it may be information that should be presented to the user, such as error or status messages, even though it was not specifically requested. Input buffer 736 is used to store the information until audio converter 734 is ready to process it, thereby improving the continuity of the audio transmission to the user. Additionally, input buffer 736 allows the information to be stored when the user interrupts playback, such as by issuing a pause command.

When the information received is stored in a compressed format, it is routed through decryption/decompression unit 738 before being sent to audio converter 734. Audio converter 734 converts the responsive information to audio signals 716, 718, 720, 722, 723 for output to a respective audio output device 724, 726, 728, 730, 732, 733. Thus, in addition to car stereos, the present invention may be utilized to deliver responsive information using many types of devices that include a built-in speaker 730 and/or headphones 732, including cellular telephones and other personal communication devices. Further, a combination of output devices may also be used, such as a cellular telephone that is configured to deliver audio signals to car radio 726, headphones 732, and/or speaker 730.

In one embodiment, mobile audio device 208 includes one or more data processors 740, such as microprocessor 740, that executes software instructions to perform a variety of tasks including controlling transmission and reception of data messages and converting data messages to desired formats. The data processing associated with mobile audio device 208 may additionally be divided among several components having a dedicated data processor and program instructions to perform the tasks required of the component. Examples of components in mobile audio device 208 that may include a data processor are decryption/decompression unit 738, input buffer 736, audio converter 734, analog to digital (A/D) converter 706, and compression unit 708.

In another embodiment, mobile audio device 208 is a standalone device that may be located in the mobile vehicle or machine, or at a stationary location with the ability to transmit audio output signals 716, 718, 720, 722, 723 to one or more audio output devices 724, 726, 728, 730, 732, 734. Alternatively, mobile audio device 208 may be incorporated in other components of network browser system 200 such as car radio 726, cellular telephone 220, wireless communication system 202, or VIS 204.

In another embodiment, control switches 742, such as buttons and dials, are provided to allow the user to enter browser navigation commands and browser control selections. Control switch selections are converted to information requests or browser controls by program instructions in data processor 740.

Wireless data that is transmitted to mobile audio device 208 may be in one of several formats depending on the transmission protocol being utilized. These formats include, but are not limited to, circuit-switched voice 746, circuit-switched data 748, and packet/cell-switched data 740. Circuit-switched voice 746 and circuit switched data 748 are transmitted using a circuit switching technique where a circuit between the calling and called stations is physically established on demand, for the exclusive use by the two stations, until the connection is released. A packet is a group of bits switched as a unit for transmission over a shared network and is the basic unit of transmission in a packet-switched network. Packet-switched data 740 is transmitted using a transmission protocol in which data is segmented into packets that can be individually addressed and routed through the network, possibly using several different routes. The sequence of the packets is maintained and the destination established by the exchange of control information, contained in the packets, between the sending terminal and the network before the transmission starts. The receiving-end node determines that all packets are received and in the proper sequence before forwarding the reassembled message to the addressee. Packet switching allows facility sharing by many users. Packets can be routed individually over the best available network connection in a packet switching network, and reassembled to form a complete message at the destination. Control information is carried in the packet, along with the data, to provide for addressing sequence, flow control, and error control at each of several protocol levels. A packet can be of fixed or variable length, but usually has a specified maximum length of 1024 bits. Cell switched data is similar to packet-switched data, except it is transmitted using a different transmission protocol.

For circuit-switched voice 746, VIS 204 replays the responsive information directly when the information is in pre-recorded audio format. When the information is in text format, VIS 204 converts the text to a speech format, based on the requirements of the particular audio output device. VIS 204 is capable of converting a variety of different text formats to a variety of different audio formats. The formatted information is transmitted to mobile audio device 208, which includes one or more data processors 740 that perform the required processing to format the information for transmission to audio converter 734. Audio converter 734 also includes a data processor for processing the information for output to the audio output device.

Circuit-switched data 748 is sent to mobile audio device 208 either as compressed digital audio data or as digital data representing text. Compressed digital data is transmitted to input buffer 736, and converted to a decompressed format by decryption/decompression unit 738. Audio converter 734 converts the decompressed information to one or more audio output signals 716, 718, 720, 722, 723 for output to one or more audio output devices 724, 726, 728, 730, 732, 734.

For packet-switched and cell-switched data, the information is transmitted similar to the transmission of circuit-switched data, except that a packet-switched or cell-switched data transmission protocol is used between content server 210, VIS 204, and wireless communication network 202. Packet-switched and cell-switched data is most likely to be used between content server 210, VIS 204, and wireless communication network 202 in the present invention using wireless communication networks 202 currently available.

Alternatively, or in addition to wireless data, the responsive information may be transmitted via conventional telephone system 218 through telephone line 752. Another alternative is providing responsive information from a disk on disk drive 754. The information on disk drive 754 may have been stored during a previous session, and is thus available for playback at a later time by the user.

Notably, radio 726 may be any type of a radio capable of being used in a mobile vehicle, and the present invention is particularly suitable for use with a car's existing built-in stereo system. One embodiment of the present invention utilizes a short-range AM/FM radio transmitter. In this embodiment wireless communication network 202 communicates with mobile audio device 208 using a cellular or satellite network, and mobile audio device 208 broadcasts the information using short-range AM/FM signals to a pre-selected AM/FM frequency that is received by car radio 726 (e.g., a built-in car radio). Another embodiment of the present invention provides signals to radio 726 from audio converter 734 via a direct electrical connection to standard input plugs such as CD, FM or line-in. Still another embodiment of the present invention includes an adapter device, such as cassette adapter, that is operable to receive signals from car radio 726 and output them to a recording device for storing the responsive information on a storage medium. The responsive information may then be played back at the user's convenience.

Content aggregation server 210 includes one or more computer systems that aggregate information retrieved from remote servers 214, as requested by the user. The information is stored as compressed or uncompressed digital voice format, text format, or any other applicable format that may be used to represent the information. Servers 210, 212, 214 are connected to information network 216 via a high-speed connection, and can quickly retrieve information from one of servers 214 if the information requested is not found on local content aggregation server 210.

Personalization server 212 includes one or more computer systems that are used to store personal information about users. One embodiment of the present invention allows the user to customize the information broadcast from the wireless network over the car radio or other audio output device. The user may also customize menus and select options for presenting the responsive information, or the user may alternatively use a default set of selections that are available to all users. Personal information may include, but is not limited to, user name, password, information preferences such as, for example, a list of stocks for which current stock market price is desired, and news information sources to utilize. The user may enter preferences using microphone 704, conventional telephone system 218, cellular telephone system 220, or workstation 222 connected to personalization server 212 through information network 216.

Figure 8:
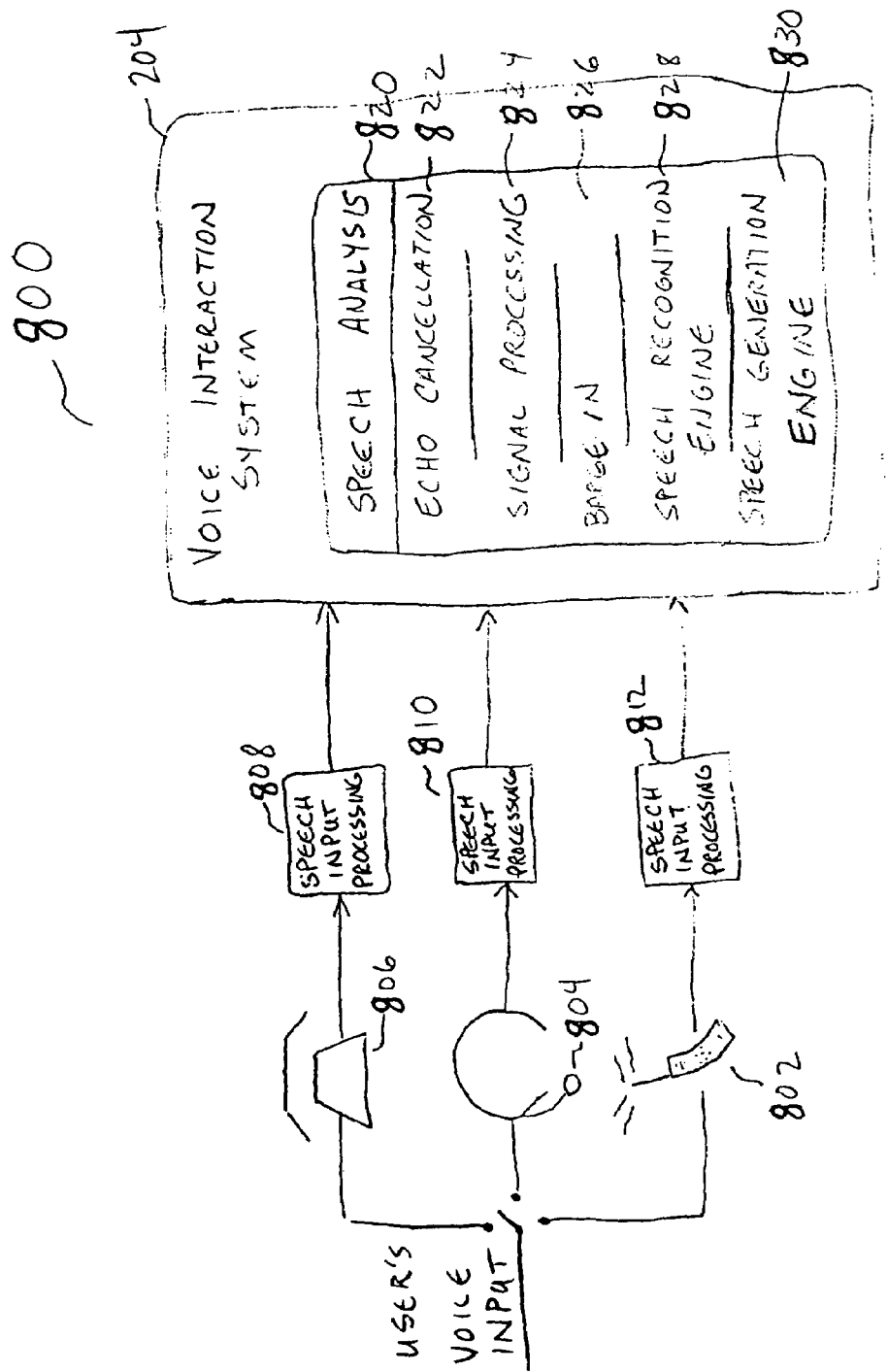
FIG. 8 is a block diagram of a voice recognition system for accessing an information network as found in the prior art.

VIS 204 is operable to recognize commands from a user's speech for interaction with content aggregation server 210, personalization server 212, as well as remote servers 214 through information network 216. An example of a voice recognition system 800 suitable for use with the present invention is shown in FIG. 8. Such a voice recognition system may be used for a variety of purposes including inputting data and commands to an information network browser program or electronic mail program, and controlling operation of a device. Voice recognition system 800 may be tailored to a specific use and therefore may be programmed to recognize and respond to certain words or phrases as being valid system commands or input. Such words and phrases are typically determined and implemented before voice recognition system 800 is deployed; however, voice recognition system 800 may also have the capability to adapt to changed conditions, such as, for example, to dynamically adjust to a change or substitution of hardware components, including switching between wireless telephone 802, microphone 804, and conventional telephone system 806 for input.

Referring now to FIGS. 2 and 8, VIS 204 is implemented on a data processing system, which may be one of several different types of data processing systems including, for example, mainframes, minicomputers, workstations, servers, personal computers, Internet terminals, laptop computers, palmtop computers, and embedded systems. The data processing system may be one of many workstations connected to a network such as a local area network (LAN), a wide area network (WAN), and/or information network 216.

A user's voice is input to a speech input device, such as wireless telephone 802, microphone 804, or conventional telephone 806, which, depending on the device, generates an analog or a digital input signal representing the acoustic wave input of the user's natural speech. The analog input signals are coded as speech data using an appropriate speech input processor 808, 810. Speech data can be coded as, for example, Adaptive Differential Pulse Coded Modulation (ADPCM) using commercially available modulation devices. In addition, or alternatively, speech data may be transferred coded as Linear Predictive Coding (LPC) parameters or other parameters achieving low bit rates (e.g. 4.8 Kbits/second), or using a compressed format, such as, for example, MPEG 1 layer 3 (MP3).

For an input device that provides an analog signal, speech input processors 808, 810 convert the analog signal to digital samples of the analog signal at a prescribed rate, and transmit the digital samples as electrical signals representing the speaker's voice. For an input device that provides signals that are already in digital format, such as wireless telephone 802, the voice signals are already sampled at regular, short intervals, to create a digital representation of the original voice wave. Speech input processor 812 next processes the digitized voice, resulting in a compressed representation of the digital voice signal. The signals representing the speaker's voice are input to VIS 204, which processes and analyzes the digital signals. It is important to note that VIS 204 may receive voice input in analog format, in which case it performs standard voice recognition. In other implementations, VIS 204 may receive the voice in a compressed/encrypted digital format, in which case VIS 204 would have to decrypt, decompress, and convert the signal to an analog signal before processing voice recognition.

During operation, VIS 204 utilizes speech analysis unit 820, which includes program instructions that may be embodied in one or more executable modules that are executed as required. The program instructions are commercially available and may perform several processing functions including echo cancellation 822, signal processing 824, barge-in 826, speech recognition 828, and speech generation 830.

Echo cancellation 822 removes echoes caused by delays (e.g., in a telecommunications network) or reflections from acoustic waves in the immediate environment. This provides higher quality speech for recognition and processing by VIS 204.

Barge-in 826 may detect speech received at speech input coders 808, 810. In one embodiment, barge-in 826 may distinguish human speech from ambient background noise. Barge-in 826 is optional, and therefore, may not be present in every implementation.

Signal processing 824 performs signal processing operations which, among other things, may include transforming speech data received in time domain format (such as ADPCM) into a series of feature parameters such as, for example, standard cepstral coefficients, Fourier coefficients, LPC coefficients, or other parameters in the time or frequency domain. For example, in one embodiment, signal processing component 824 may produce a twelve-dimensional vector of cepstral coefficients every 10 milliseconds to model speech input data. Software for implementing signal processing 824 is commercially available from line card manufacturers and automated speech recognition (ASR) suppliers.

Speech recognition 828 recognizes vocalized speech input from speech input signals. As shown, speech recognition 828 may comprise an acoustic model component and a grammar component. The acoustic model component may comprise one or more reference voice templates which store previous enunciations, or acoustic models, of certain words or phrases by particular users. Acoustic model component recognizes the speech of the same users based upon their previous enunciations stored in the reference voice templates. The grammar component may specify certain words, phrases, and/or sentences which are to be recognized if spoken by a user. Recognition grammars for the grammar component can be defined in a grammar definition language (GDL), and the recognition grammars specified in GDL can then be automatically translated into machine executable grammars. In one embodiment, the grammar component may also perform natural language processing. Hardware and/or software for implementing recognition grammars is commercially available from a number of vendors and can typically be modified for particular applications.

Speech generation 830 generates speech data representing responses to information requests, prompts, or other messages, which is intended to be heard by a user. Speech generation 830 comprises a text-to-speech (TTS) component which synthesizes human speech by "speaking" text, such as that contained in a textual HTML document. The text-to-speech component may utilize one or more synthetic speech mark-up files for determining, or containing, the speech to be synthesized. Software for implementing the text-to-speech component is commercially available from a number of companies.

Figure 9:
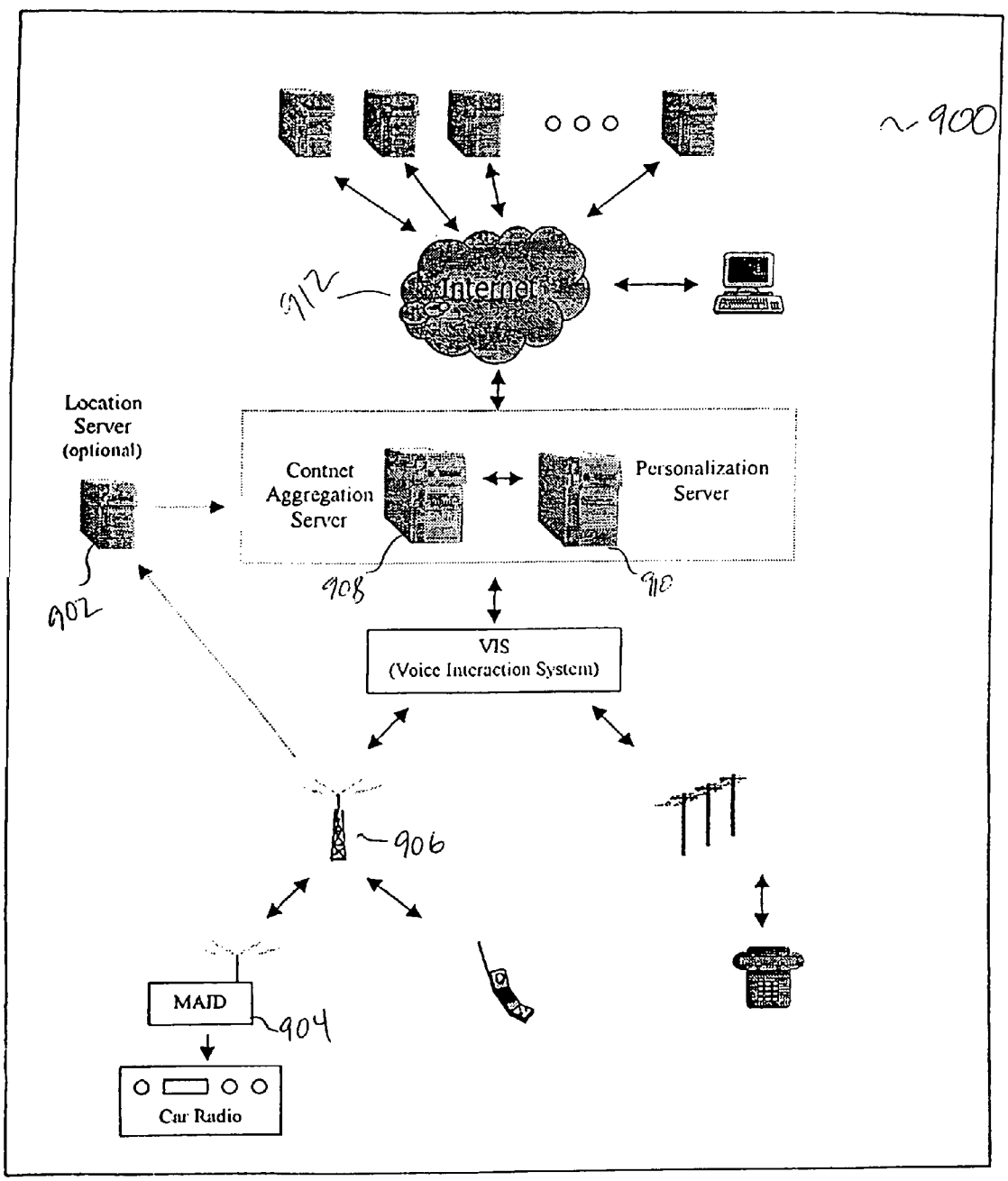
FIG. 9 is a diagram of another embodiment of a system for accessing an information network in accordance with the present invention.

FIG. 9 shows another embodiment of the present invention of a system 900 with position-keeping and voice recognition and feedback capability for browsing an information network. System 900 includes components similar to the embodiment shown in FIG. 2, with the addition of location server 902 and position-keeping capabilities to provide the location of mobile audio device 904. The position-keeping capabilities may be provided by one or more of several known systems for supplying the location of a movable object. Such systems include, but are not limited to, global positioning systems (GPS), inertial navigation systems, triangulation systems using signals from wireless communication network 906, and dead reckoning navigation systems. The position-keeping system may provide coordinates of mobile audio device 904 in any system desired including Cartesian (x, y, z) coordinates with respect to a known reference point, or latitude/longitude/altitude/heading with respect to the known earth navigation system.

The position-keeping system, or components of the position-keeping system, is included in one or more of any appropriate components comprising the present invention. For example, a GPS receiver may be included in mobile audio device 904 to receive the coordinates of mobile audio device 904 from a GPS satellite network as the mobile audio device 904 moves from location to location. The particular components included in any given positioning-keeping system and their function will dictate the most appropriate component in the present invention in which to include a particular component of the position-keeping system.

Location server 902 communicates with wireless communication network 906, content server 908, and personalization server 910. The coordinates of mobile audio device 904 are transmitted to location server 902 via wireless communication network 906. Location server 902 may then transmit location information to content server 908 and/or personalization server 910 to be used in providing a wide variety of personalized location-specific information to the user. For example, a user having an automobile equipped with mobile audio device 904 may personalize his or her profile so that the names of restaurants within a 5-mile radius of his or her specific location are provided when requesting locations of local restaurants. Another example is to use the location information to provide driving instructions to a requested destination. Such a system may be integrated with position-keeping and navigation systems available in some models of automobiles. It will be apparent to one skilled in the art that the location-specific information may be used to provide virtually any type of location-related information to the user.

In another embodiment, mobile audio device 904 includes capability to detect and compensate for data transmission errors in wireless communication network 906. Such capability utilizes location information to determine when mobile audio device 904 is coming near an area covered by wireless communication network 906 where there is a high incidence of data loss due to propagation errors caused by such factors as atmospheric effects, the presence of earth bulge, and the effects of trees, buildings, and hills which exist in, or close to, the transmission path. This information is stored in a database, and the error detection/compensation routine compares the location of the mobile audio device 904 to error information in the database. When mobile audio device 904 is likely to experience a data loss rate that is higher than a pre-selected value, one of several options may be taken including informing the user of the likelihood of errors or gaps in the information, asking the user if they would prefer to wait for the information until transmission of the data will be more reliable, or buffering a greater than normal amount of information to be able to continue undisrupted output until the connection is re-established.

One skilled in the art will recognize that the functions performed by location server 902 may be integrated in another server connected to information network 912, such as content server 908, thereby eliminating the need for a separate server for location server 902.

Figure 10:
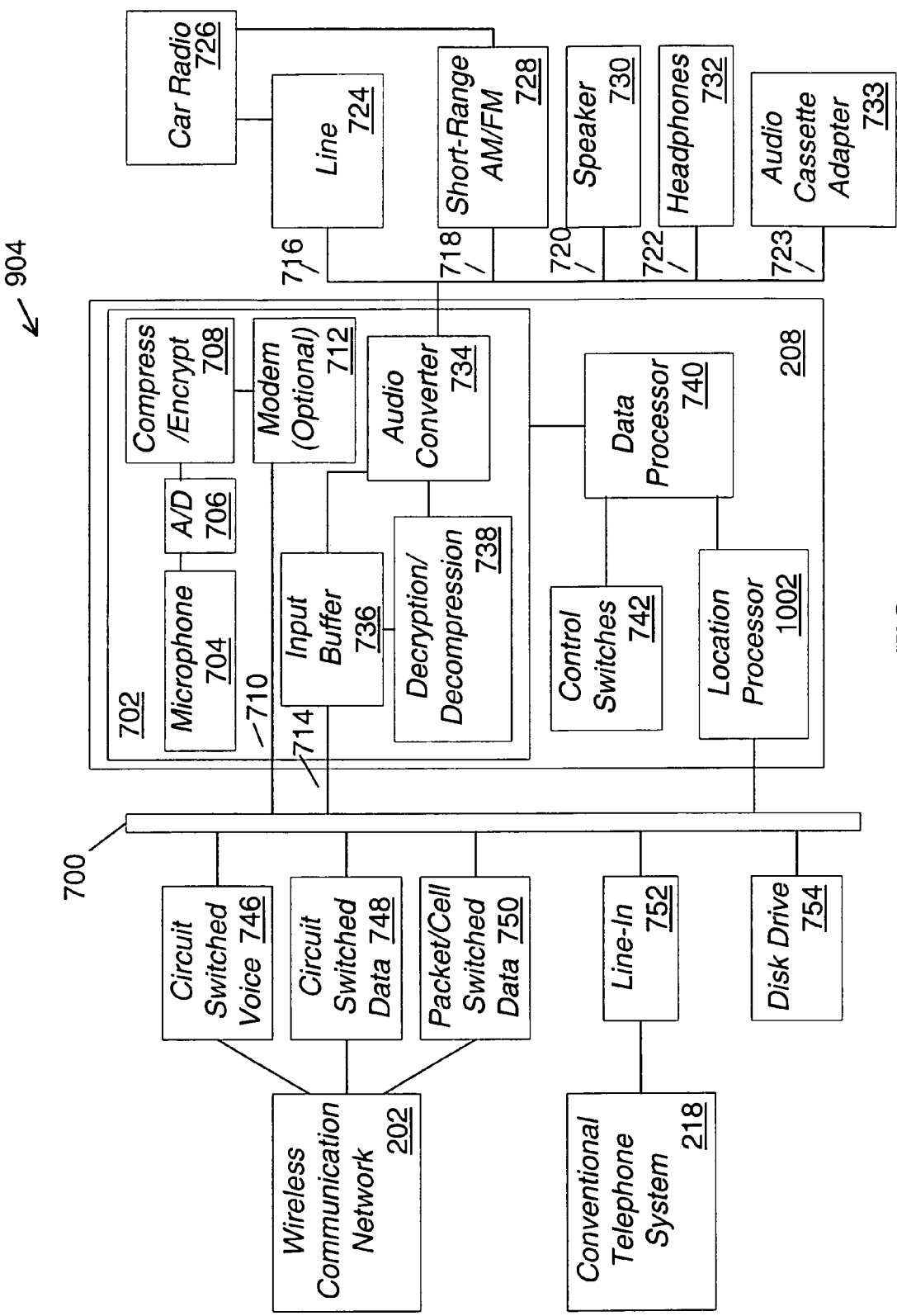
FIG. 10 is a block diagram of another embodiment of a mobile audio device in accordance with the present invention.

FIG. 10 shows a block diagram of an embodiment of mobile audio device 904 with location processor 1002. Mobile audio device 904 corresponds to the system 900 with position-keeping and voice recognition and feedback capability for browsing an information network in FIG. 9. Location processor 1002 may be a dedicated data processor such as an application-specific integrated circuit (ASIC) designed specifically to handle location data, or the location data may be processed in another data processor that is also used for other purposes in mobile audio device 904.

Figure 11:
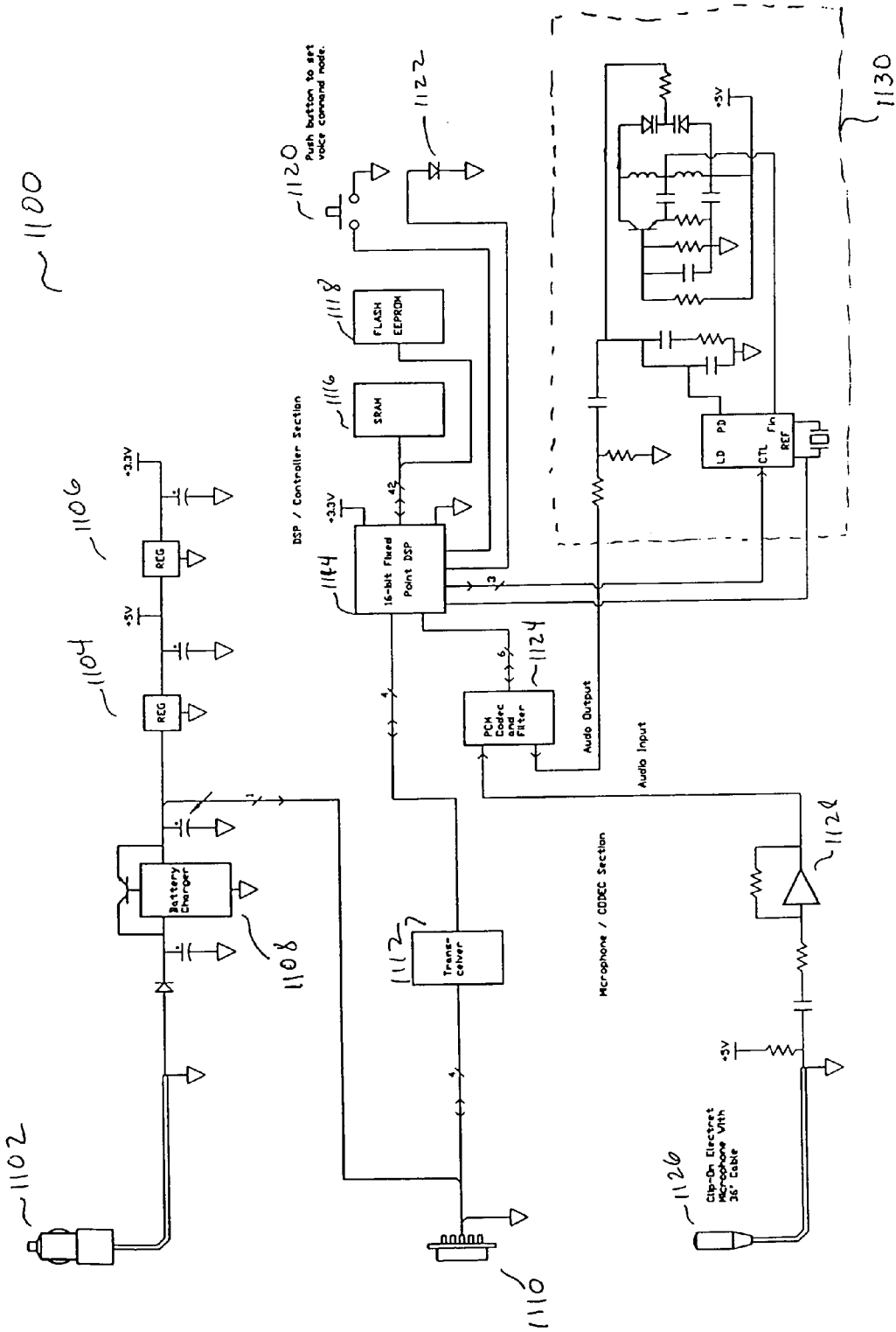
FIG. 11 is a schematic diagram of components included in one embodiment of the present invention for a mobile audio browsing device.

FIG. 11 shows a schematic diagram of one embodiment of the present invention for mobile audio device 1100 that is designed as an adapter to a mobile telephone. Mobile audio device 1100 may receive power through adapter plug 1102 when adapter plug 1102 is plugged into an automobile's cigarette lighter receptacle. Alternatively, power may be supplied by the mobile telephone's battery through voltage regulators 1104 and 1106 at 5 volts and 3.3 volts, respectively. When adapter plug 1102 is plugged into a cigarette lighter receptacle, battery charger 1108 provides recharging power from the automobile to the mobile telephone's battery back. A modem link is established between mobile audio device 1100 and the mobile telephone through connector 1110, which may be one of any suitable type of interface connectors known in the art for transmitting data and power signals, such as RS232 data communication at 115.2 k baud using TCP/IP connection protocol. Battery charger 1108 may be eliminated when mobile audio device 1100 is used with a mobile telephone that includes a 12 volt adapter and power is provided over the modem cable to mobile audio device 1100.

The mobile telephone establishes a communication line with information network 912 (FIG. 9) through wireless communication network 202 (FIG. 7). Transceiver 1112 provides two-way communication between data signals from connector 1110 and digital signal processor (DSP) 1114, such data including requests for information from DSP 1114, and information responsive to requested information from information network 912. DSP 1114 executes software instructions to perform a variety of tasks including controlling transmission and reception of data messages and converting data messages to desired formats. DSP 1114 may also be used to perform speech recognition and voice decompression functions. Memory devices, such as static ram memory device 1116 and flash memory device 1118 are coupled to DSP 1114 to provide data storage. DSP 1114 is also coupled to receive input from push button control switch 1120 which may be used in one or more ways to control operation of mobile audio device 1100. For example, a single quick push of switch 1120 causes the telephone to dial a pre-programmed phone number for establishing communication with information network 912. A longer, several second push of switch 1120 causes mobile audio device 1100 to enter a configuration mode to allow a user to set the FM output frequency and/or the pre-programmed telephone number for accessing information network 912. The numeric information is entered via the telephone's numeric keypad. Switch 1120 may also be used to put mobile audio device 1100 into a voice command mode, allowing handsfree selection and activation of pre-programmed information requests, audio volume control, and FM channel selection. Light emitting diode (LED) 1122 provides one or more visual indicators of mobile audio device's 1100 operational status. Note that other control switches may be used in addition or instead of switch 1120 to control operation of mobile audio device 1100. Alternatively, mobile audio device 1100 could operate without switch 1120 by operating in a continuous speech recognition mode when powered on.

Audio coder/decoder (codec) 1124 is coupled for two-way communication with DSP 1114. Codec 1124 also receives input from the user through the combination of microphone 1126 and amplifier 1128, and provides an audio output signal, such as output signals 716, 718, 720, 722, 723 in FIG. 7, to the audio output device, shown as a short-range FM transmitter 1130. Codec 1124 performs data compression, encryption, decompression, and decryption, and also includes an input buffer for storing data.

The embodiment of mobile audio device 1100 shown in FIG. 1 may be packaged in a separate casing that is small enough to be hand-held or carried in a shirt pocket. The cigarette plug cable, the modem cable, and the microphone cable may be fixedly or removably attached to the casing. In one embodiment, mobile audio device 1100 operates under section 15.239 of the Federal Communication Commission (FCC) regulations, which provides for unlicensed operation in the FM broadcast band.

While the invention has been described with respect to the embodiments and variations set forth above, these embodiments and variations are illustrative and the invention is not to be considered limited in scope to these embodiments and variations. For example, transmitting audio output signals 716, 718, 720, 722, 723 may be performed by VIS 204, which takes the responsive information and converts it to voice when text-to-speech conversion is required. Alternatively, when mobile audio device 208 includes text-to-speech technology, mobile audio device 208 communicates directly with content server 210, effectively bypassing VIS 204. Accordingly, various other embodiments and modifications and improvements not described herein may be within the spirit and scope of the present invention, as defined by the following claims.

What is claimed is:

1. A mobile browser system with adaptive personalization and audio feedback capability for retrieving information from an information network, the information network comprising a plurality of network servers, the browser system comprising:
   a wireless communication interface operable to transmit data to one or more of the plurality of network servers, to receive user input, and to receive data from one or more of the plurality of network servers, wherein the data transmitted to the one or more of the plurality of network servers includes a request for information, and the data received from the one or more of the plurality of network servers includes information responsive to the request;
   an audio interface operable to receive data from the wireless communication interface; and
   an adaptive personalization module operable to monitor the user input during one or more previous sessions with the browser system, and to determine the order for presenting the requested information based on previous user input.

2. The browser system, as set forth in claim 1, wherein the adaptive personalization module is further operable to update a user's model based on the previous user input and the user's model is used to determine the order for presenting the requested information.

3. The browser system, as set forth in claim 1, wherein the adaptive personalization module is further operable to update a user's model based on whether the user input a command to skip playback of the requested information.

4. The browser system, as set forth in claim 1, wherein the adaptive personalization module is further operable to update a user's model based on whether the user input a command to fast-forward or rewind playback of the requested information.

5. The browser system, as set forth in claim 1, wherein the adaptive personalization module is further operable to update a user's model based on whether the user requested more detail on the requested information.

6. The browser system, as set forth in claim 1, wherein the adaptive personalization module is further operable to generate a representation of each piece of content in the requested information, and the order of presentation of the requested information is determined based on the user's model and the representation.

7. The browser system, as set forth in claim 6 wherein the adaptive personalization module is further operable to convert the responsive information from a text format to an audio format, and the representation includes the frequency with which each word occurs in each piece of content.

8. The browser system, as set forth in claim 6 wherein the adaptive personalization module is further operable to convert the responsive information from an audio format to a text format, and the representation includes the frequency with which each word occurs in each piece of content.

9. The browser system, as set forth in claim 1 wherein the adaptive personalization module is further operable to determine whether the requested information is redundant compared to information presented during a previous session.

10. The browser system, as set forth in claim 1 wherein the adaptive personalization module is further operable to determine whether a piece of content in the requested information is redundant compared to one or more other pieces of content in the requested information.

11. The browser system, as set forth in claim 1, further comprising a user interface operable to allow the user to generate and modify a playlist, wherein the playlist is included in the user's model.

12. The browser system, as set forth in claim 11, wherein the user interface is a graphical user interface.

13. The browser system, as set forth in claim 11, wherein the user interface is an audio interface.

14. The browser system, as set forth in claim 11, wherein the user interface is a telephone interface.

15. The browser system, as set forth in claim 11, wherein the user interface is a wireless telephone interface.

16. The browser system, as set forth in claim 1, wherein the adaptive personalization module is further operable to generate and modify a user's playlist.

17. The browser system, as set forth in claim 1, further comprising:
   a mobile audio device having an audio converter, the audio converter being operable to receive the information responsive to the request, the audio converter being further operable to convert the responsive information to an audio signal for output to an audio output device, wherein the audio converter outputs the audio signal to a short-range wireless radio, the short-range wireless radio being operable to broadcast the audio signal to a channel on a car radio.

18. The browser device, as set forth in claim 1, further comprising:
an input buffer for storing the responsive information until the user commands the browser device to playback the responsive information.

19. A mobile information network browser device with feedback capability for retrieving information from an information network, the information network comprising a plurality of network servers, the browser device comprising:
a communication interface operable to transmit a request for information to a network server, and to receive data responsive to the request from the network server;
a mobile audio device operable to transmit the request for information to the communication interface and to receive data responsive to the request from the communication interface, the mobile audio device being further operable to receive input from a user, to convert the input to a digital signal, and to transmit the digital signal to the communication interface, the mobile audio device being further operable to receive the data responsive to the request from the communication interface, and to convert the data to an audio signal for output to an audio output device; and
an adaptive personalization module operable to monitor the user input during one or more previous sessions with the browser device, and to determine the order for presenting the requested information based on previous user input.

20. The browser device, as set forth in claim 19, further comprising:
a voice interaction system operable to recognize commands from a user's speech input for interaction with the browser device including the request for information.

21. The browser device, as set forth in claim 19, wherein the adaptive personalization module is further operable to update a user's model based on the previous user input and the user's model is used to determine the order for presenting the requested information.

22. The browser device, as set forth in claim 19, wherein the adaptive personalization module is further operable to update a user's model based on whether the user input a command to skip playback of the requested information.

23. The browser device, as set forth in claim 19, wherein the adaptive personalization module is further operable to update a user's model based on whether the user input a command to fast-forward or rewind playback of the requested information.

24. The browser device, as set forth in claim 19, wherein the adaptive personalization module is further operable to update a user's model based on whether the user requested more detail on the requested information.

25. The browser device, as set forth in claim 19, wherein the adaptive personalization module is further operable to generate a representation of each piece of content in the requested information, and the order of presentation of the requested information is determined based on the user's model and the representation.

26. The browser device, as set forth in claim 25, wherein the adaptive personalization module is further operable to convert the responsive information from a text format to an audio format, and the representation includes the frequency with which each word occurs in each piece of content.

27. The browser device, as set forth in claim 25, wherein the adaptive personalization module is further operable to convert the responsive information from an audio format to a text format, and the representation includes the frequency with which each word occurs in each piece of content.

28. The browser device, as set forth in claim 19, wherein the adaptive personalization module is further operable to determine whether the requested information is redundant compared to information presented during a previous session.

29. The browser device, as set forth in claim 19 wherein the adaptive personalization module is further operable to determine whether a piece of content in the requested information is redundant compared to one or more other pieces of content in the requested information.

30. The browser device, as set forth in claim 19, further comprising a user interface operable to allow the user to generate and modify a playlist, wherein the playlist is included in the user's model.

31. The browser device, as set forth in claim 30, wherein the user interface is a graphical user interface.

32. The browser device, as set forth in claim 30, wherein the user interface is an audio interface.

33. The browser device, as set forth in claim 30, wherein the user interface is a telephone interface.

34. The browser device, as set forth in claim 30, wherein the user interface is a wireless telephone interface.

35. The browser device, as set forth in claim 30, wherein the adaptive personalization module is further operable to generate and modify a user's playlist.

36. The browser device, as set forth in claim 19, further comprising:
an input buffer for storing the responsive information until the user commands the browser device to playback the responsive information.

37. A method of browsing an information network via a wireless communication network and receiving responsive information using a mobile audio device, the method comprising:
transmitting input from a user via the wireless communication network to a data processor;
processing the input to determine when the user enters a valid browsing command;
transmitting the browsing command to a server on the information network;
receiving the responsive information from the server;
adaptively determining the order for presenting the responsive information based on user input indicating interest in the category of responsive information during one or more previous sessions with the mobile audio device;
formatting the responsive information in audio format;
transmitting the formatted audio information to the mobile audio device via the wireless communication network;
generating an audio output signal in the mobile audio device; and
transmitting the audio output signal to an audio output device.

38. The method, as set forth in claim 37, further comprising:
recognizing commands from a user's speech input for interaction with the mobile audio device including the browsing command.

39. The method, as set forth in claim 37, wherein adaptively determining the order for presenting the responsive information includes updating a user's model based on the previous user input and determining the order for presenting the responsive information based on a user's model.

40. The method, as set forth in claim 37, wherein adaptively determining the order for presenting the responsive information includes updating a user's model based on whether the user input a command to skip playback of the responsive information.

41. The method, as set forth in claim 37, wherein adaptively determining the order for presenting the responsive information includes updating a user's model based on whether the user input a command to fast-forward or rewind playback of the responsive information.

42. The method, as set forth in claim 37, wherein adaptively determining the order for presenting the responsive information includes updating a user's model based on whether the user requested more detail on the responsive information.

43. The method, as set forth in claim 42, wherein adaptively determining the order for presenting the responsive information includes generating a representation of each piece of content in the responsive information, and the order of presentation of the responsive information is determined based on the user's model and the representation.

44. The method, as set forth in claim 43 wherein adaptively determining the order for presenting the responsive information includes converting the responsive information from a text format to an audio format, and the representation includes the frequency with which each word occurs in each piece of content.

45. The method, as set forth in claim 43 wherein adaptively determining the order for presenting the responsive information includes converting the responsive information from an audio format to a text format, and the representation includes the frequency with which each word occurs in each piece of content.

46. The method of claim 37 wherein the mobile audio device includes at least a portion of a position-keeping system, the method further comprising:

providing the position of the mobile audio device to the information network via the wireless communication network, wherein the responsive information is based on the location of the mobile audio device.

47. The method, as set forth in claim 37, further comprising determining whether the requested information is redundant compared to information presented during a previous session, and limiting the amount of redundant information that is presented to the user.

48. The method, as set forth in claim 37, further comprising determining whether a piece of content in the requested information is redundant compared to one or more other pieces of content in the requested information, and limiting the amount of redundant information that is presented to the user.

49. The method, as set forth in claim 37, wherein adaptively determining the order for presenting the responsive information includes modifying a user's playlist.

50. The method, as set forth in claim 37, further comprising:

storing the responsive information in a buffer until the user commands the browser device to playback the responsive information.

* * * * *